(12) United States Patent
Bergman et al.

(10) Patent No.: US 9,406,214 B2
(45) Date of Patent: *Aug. 2, 2016

(54) COMMUNICATING WITHIN A WIRELESS SECURITY SYSTEM

(71) Applicant: Resolution Products, Inc., Hudson, WI (US)

(72) Inventors: John Bergman, River Falls, WI (US); Paul G. Saldin, Stillwater, MN (US); Brian K. Seemann, Lakeville, MN (US); Daniel Mondor, Hudson, WI (US)

(73) Assignee: Resolution Products, Inc., Hudson, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,752

(22) Filed: Mar. 2, 2015

(65) Prior Publication Data

US 2015/0170506 A1    Jun. 18, 2015

Related U.S. Application Data

(63) Continuation of application No. 13/908,577, filed on Jun. 3, 2013, now Pat. No. 8,970,368, which is a continuation of application No. 12/730,987, filed on Mar. 24, 2010, now Pat. No. 8,456,278.

(51) Int. Cl.
*G08B 1/08* (2006.01)
*G08B 25/10* (2006.01)
(Continued)

(52) U.S. Cl.
CPC .............. *G08B 25/10* (2013.01); *G08B 25/003* (2013.01); *G08B 25/007* (2013.01); *H04L 69/18* (2013.01)

(58) Field of Classification Search
CPC .. G08B 25/10; G08B 19/005; G08B 21/0238; G08B 27/001; G08B 27/005; G08B 29/02; G08B 25/007; G08B 25/003; H04L 69/18; H04L 69/14; H04L 69/08; H04L 12/66; H04L 29/06068; H04L 29/06088; H04L 29/06476; H04L 29/08756; H04L 63/02; H04L 29/08072; H04N 21/2343
USPC ...................... 455/7, 11.1, 13.1, 16; 370/211; 340/9.16, 521, 522, 539.16, 539.17, 340/539.18, 539.19, 539.22, 540, 541, 340/545.1, 547, 545.4, 545.6, 545.8, 545.9, 340/506, 870.16
See application file for complete search history.

(56) References Cited

U.S. PATENT DOCUMENTS 4,855,713 A   8/1989  Brunius
5,686,885 A   11/1997 Bergman
(Continued)

OTHER PUBLICATIONS

ADEMCO 5800RP, Data Sheet, Apr. 2003, 1 pg.
(Continued)

*Primary Examiner* — An T Nguyen
(74) *Attorney, Agent, or Firm* — Fish & Richardson P.C.

(57) ABSTRACT

Techniques are provided that enable a wireless security system that is designed to detect and receive wireless transmissions in one protocol, to use sensor-transmitters that operate in a different protocol. The techniques involve, generally, the use of an integration device, and in some implementations, first enrolling sensor-transmitters of a first protocol into the integration device, along with device type information for the sensor-transmitters. Thereafter, during system operation, transmissions with message packets in the first message packet protocol are received by the integration device, recognized as having been previously enrolled, and a message packet in a second message packet protocol that includes device type information is then formulated and transmitted by the integration device, for receipt by a system control device for the wireless security system. In some scenarios, an enrollment process need not be done in the integration device, and the integration device is utilized in the communication process.

18 Claims, 13 Drawing Sheets

(51) Int. Cl.
*G08B 25/00* (2006.01)
*H04L 29/06* (2006.01)

(56) References Cited

U.S. PATENT DOCUMENTS

| | | | |
|---|---|---|---|
| 5,686,896 A | 11/1997 | Bergman | |
| 5,761,206 A * | 6/1998 | Kackman | G08B 25/10 340/506 |
| 5,801,626 A | 9/1998 | Addy | |
| 6,247,062 B1 * | 6/2001 | Sarkar | H04L 45/00 370/409 |
| 6,624,750 B1 | 9/2003 | Marman et al. | |
| 6,987,450 B2 | 1/2006 | Marino et al. | |
| 7,030,752 B2 * | 4/2006 | Tyroler | H04L 63/20 340/531 |
| 7,039,391 B2 | 5/2006 | Rezvani et al. | |
| 7,119,658 B2 | 10/2006 | Stilp | |
| 7,120,795 B2 | 10/2006 | Raphael et al. | |
| 7,576,646 B2 | 8/2009 | Hayden et al. | |
| 7,804,403 B2 * | 9/2010 | Chantelou | G08B 25/10 340/531 |
| 7,839,280 B2 * | 11/2010 | Peters | H04L 67/12 340/539.22 |
| 8,160,574 B1 | 4/2012 | Nelson | H04W 52/24 340/517 |
| 8,209,400 B2 * | 6/2012 | Baum | G06F 17/30017 709/203 |
| 2001/0010490 A1 * | 8/2001 | Bellin | H04W 84/027 340/7.46 |
| 2004/0212500 A1 * | 10/2004 | Stilp | G08B 19/005 340/541 |
| 2006/0092010 A1 * | 5/2006 | Simon | G08B 25/009 340/521 |
| 2007/0210917 A1 * | 9/2007 | Collins, Jr. | A61B 5/447 340/539.1 |
| 2008/0218336 A1 | 9/2008 | Marino | |
| 2008/0272935 A1 | 11/2008 | Peters et al. | |
| 2009/0077622 A1 * | 3/2009 | Baum | G08B 25/14 726/1 |
| 2009/0077624 A1 * | 3/2009 | Baum | G08B 25/14 726/1 |
| 2010/0318627 A1 * | 12/2010 | Edwards | G08B 25/14 709/217 |
| 2011/0001605 A1 * | 1/2011 | Kiani | G06F 19/327 340/5.6 |

OTHER PUBLICATIONS

ADEMCO 5800RP RF Repeater Module, Installation and Setup Guide, Jun. 2002, 4 pgs.
GE Interlogix QuikBridge Node repeater, Installation Instructions, Jul. 24, 2003, 8 pgs.
GE 600-1025 OEM Transceiver Module, Installation Instructions, May 2005, 2 pgs.
ITI SX-V to Learn Mode Translator, Installation Instructions, Nov. 30, 2001, 4 pgs.
GE ID Repeater Daughter Board 600-1031, Installation Instructions, Apr. 2005, 4 pgs.
OEM Transceiver Module with Crystal Transmitter 600-1046-95, Installation Instructions, Feb. 2006, 2 pgs.

* cited by examiner

PACKET PROTOCOL #1

| BIT NOS. | NUMBER OF BITS | NAME / FUNCTION |
|---|---|---|
| B0-B14 | 15 | 1 PRE-START BIT AND 14 SYNCHRONIZATION BITS |
| B15 | 1 | START BIT |
| B16-B39 | 24 | UNIQUE IDENTIFY CODE FOR SENSOR (DEVICE ID) |
| B40 | 1 | SENSOR STATE INFORMATION — PIN 1 |
| B41 | 1 | SENSOR STATE INFORMATION — PIN 2 |
| B42 | 1 | SENSOR STATE INFORMATION — PIN 3 |
| B43 | 1 | SENSOR STATE INFORMATION — PIN 4 |
| B44 | 1 | LOW BATTERY |
| B45 | 1 | SUPERVISORY |
| B46 | 1 | POWER-UP |
| B47 | 1 | SUPERVISORY SIGNAL CAPABILITY |
| B48-B63 | 16 | CYCLICAL REDUNDANCY CHECK (CRC) FOR ERROR CHECKING |

FIG. 2A

| PACKET PROTOCOL #2 |||| 
|---|---|---|---|
| BIT NOS. | NUMBER OF BITS | NAME / FUNCTION ||
| B0-B14 | 15 | SYNCHRONIZATION BITS ||
| B15 | 1 | START BIT ||
| B16-B35 | 20 | UNIQUE IDENTIFY CODE FOR SENSOR (DEVICE ID) ||
| B36-B39 | 4 | DEVICE TYPE ||
| B40-B42 | 3 | PACKET COUNT BITS ||
| B43 | 1 | SENSOR STATE INFORMATION | LOW BATTERY |
| B44 | 1 | | F1 STATE |
| B45 | 1 | | F1 LATCH |
| B46 | 1 | | F2 STATE |
| B47 | 1 | | F2 LATCH |
| B48 | 1 | | F3 STATE |
| B49 | 1 | | F3 LATCH |
| B50 | 1 | | F4 STATE |
| B51 | 1 | | F4 LATCH |
| B52 | 1 | | F5 POSITIVE LATCH |
| B53 | 1 | | F5 STATE |
| B54 | 1 | | F5 NEGATIVE LATCH |
| B55-B57 | 8 | PARITY BITS FOR ERROR CHECKING ||
| B58 | 1 | STOP BIT ||

FIG. 2B

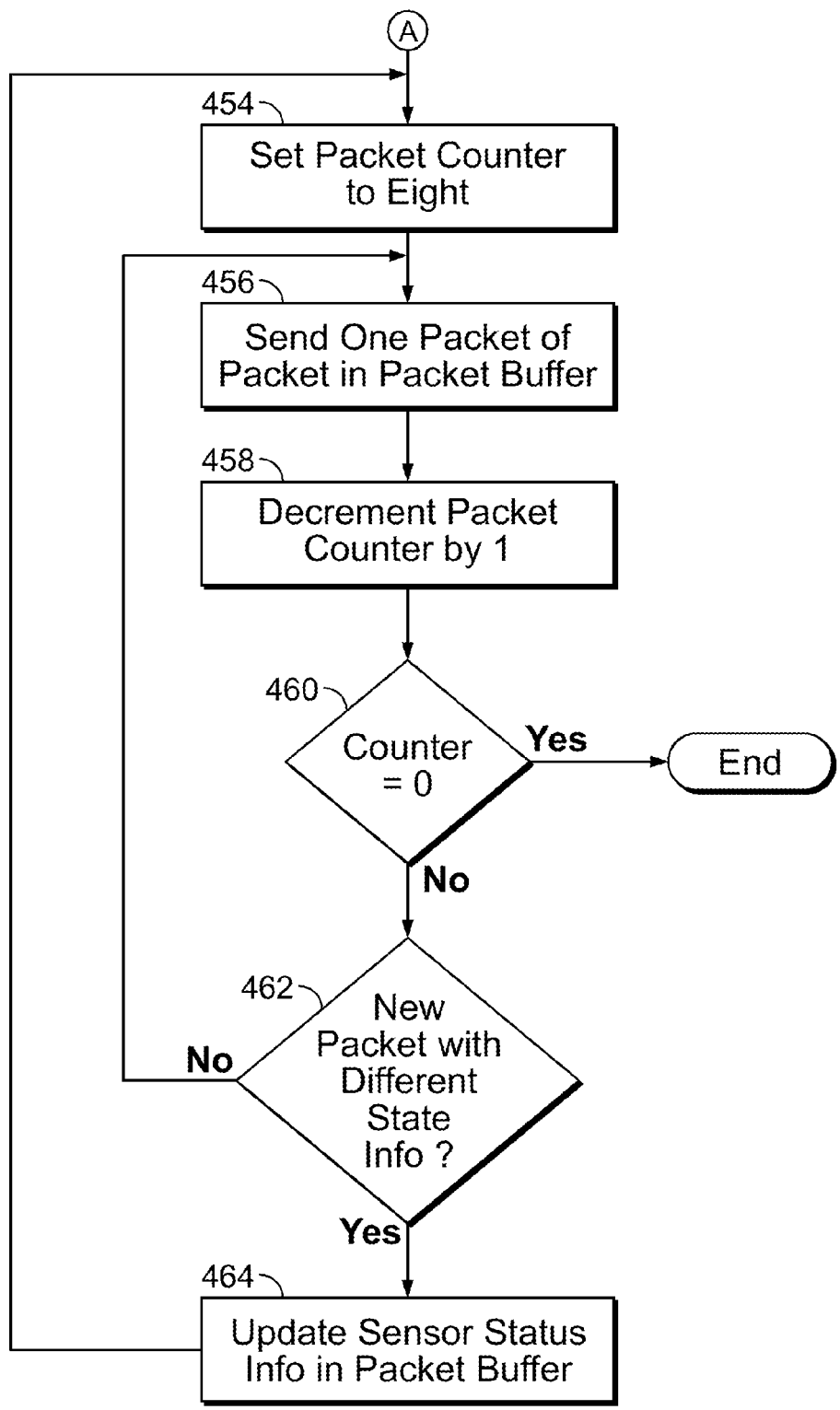
FIG. 4C (Contd.)

COMMUNICATING WITHIN A WIRELESS SECURITY SYSTEM

CLAIM OF PRIORITY

This application is a continuation and claims priority to U.S. patent application Ser. No. 13/908,577 filed Jun. 3, 2013, which is a continuation of U.S. patent application Ser. No. 12/730,987, filed on Mar. 24, 2010, the entire contents of which are hereby incorporated by reference.

TECHNICAL FIELD

This document describes techniques, methods, components and systems for communicating within a wireless security system.

BACKGROUND

Wireless security systems, as compared to their hard-wired counterparts, are made up of wireless sensor-transmitters of various types that each communicate by radio frequency (RF) wireless transmissions to a system control device that controls the operation of the security system and responds to transmissions it receives in an appropriate manner, for example, by initiating an alarm message or call for help. Wireless security systems are particularly useful for implementation in existing facilities that were not designed from the outset to have a security system and thus do not include all the wiring necessary for a hard-wired security system. Wireless security systems avoid the need for hard-wired connections to every monitored location, though wireless security systems can have a mix of wired and wireless sensors.

For a variety of reasons, it is often desirable to upgrade an existing wireless security system to include additional or different forms of protection. This may be the case if, for example, a facility (for example, a home, commercial facility, etc.) has expanded in size, the system in place has some features that are undesirable for the facility owner or operator, or the facility owner or operator wishes to have a different monitoring company in charge of the facility (for example, a monitoring company that charges a lower monthly fee), and that monitoring company requires a particular system control device with which to communicate. In such a case, it may be desirable to switch the existing system control device to a control device that has some advantage that is valuable to the facility owner or operator, but that is only able to detect and receive transmissions from sensor-transmitters that have a particular data packet protocol and definitional parameters that are specifically designed to work with the new system control device. That said, it is also not desirable to have to discard entirely an entire existing wireless security system simply to migrate to a different system control device. In particular, the existing system may include various sensor-transmitters that are satisfactory and effective, but do not transmit with a protocol compatible with the new system control device.

Another common scenario is that a competing alarm company sells a facility owner or operator a new alarm panel (system control device) that offers features not previously available when an original wireless security system was purchased. This may be driven by mobile phone connectivity and internet connectivity, for example. This competing alarm company may sell a different manufacturer control panel, and if so, may wish to leave the sensors in place to reduce the cost to the consumer and thus increase the chance of converting the customer to an upgraded system.

In addition to an upgrade scenario, it also may be the case for a wireless security system install being configured from the outset that the installer may wish to include, for a particular facility, sensor-transmitters from more than one manufacturer, or even different sensor-transmitters from the same manufacturer that have different communication configuration or protocols, or in other words, sensor-transmitters that do not all use the same data packet or communications protocol for wireless transmissions made by the sensor-transmitters. For example, the installer may be of the opinion that a certain type of sensor from manufacturer #1 is superior in performance or other factors to the same type of sensor from manufacturer #2, but that a different type of sensor from manufacturer #2 is superior to the same type of sensor from manufacturer #1. It would be beneficial in such a case to provide an easy manner for the installer to be able to implement so-called "best of breed" sensor-transmitters in a wireless security system regardless of the manufacturing source of those sensors and hence the communications protocol and definitional parameters used by those sensor-transmitters.

Another scenario that is sometimes present in the wireless security marketplace is a smaller manufacturer may have its own wireless protocol, but offers only a limited suite of sensor-transmitters to be used with its system. As such, this smaller manufacturer may wish to enable other manufacturers' sensor-transmitters to be used with its system.

SUMMARY

Generally, this specification describes systems, components and methods that enable a wireless security system that is designed to detect and receive wireless transmissions in one protocol, to use sensor-transmitters that operate in a different protocol.

In one aspect, this specification describes methods for communicating within a wireless security system, as well as systems, components and devices for performing the methods. The communication method includes receiving, at an integration device, information that identifies a device type for a particular sensor-transmitter. The particular sensor-transmitter is configured to transmit information in message packets wherein each message packet is formatted according to a first packet protocol that comprises a) a first identity code field in a first identity code field format, and b) a first condition information field in a first condition information field format. The method further includes receiving, at the integration device and from the particular sensor-transmitter, a wireless transmission that includes a first message packet comprising a) a first identity code in the first identity code field, the first identity code identifying the particular sensor-transmitter from among other sensor-transmitters, and b) first sensed condition information in the first condition information field, the sensed condition information indicative of condition information sensed by the particular sensor-transmitter.

The method also includes building, by the integration device, a second message packet formatted according to a second packet protocol comprising a second identity code field in a second protocol format, a device type encoding mechanism, and a second condition information field in a second condition information field format. The second message packet comprises a) a second identity code in the second identity code field, the second identity code identifying the particular sensor-transmitter from among other sensor-transmitters, b) information in the device type encoding mechanism that identifies the device type identified for the particular sensor-transmitter, and c) translated sensed condition information in the second condition information field. The translated sensed condition information is derived from the first sensed condition information. The method also includes transmitting, by the integration device, the second packet for receipt by a system control device for the wireless security system.

In various implementations, the methods may include one or more of the following additional features. The receiving, at the integration device, of the information that identifies the device type for the particular sensor-transmitter may include receiving a user selection of one of a plurality of different selectable device types during an enrollment process for the particular sensor-transmitter. In such a case, a message packet formatted according to the first packet protocol may not convey device type information that identifies a type of device that a sensor-transmitter is that sent the message packet, and as such, the device type information is provided separately. Alternatively, the receiving, at the integration device, of the information that identifies the device type for the particular sensor-transmitter may include receiving the wireless transmission including the first message packet, wherein message packets formatted in accordance with the first packet protocol convey device type information. In such a case, the device type information may be conveyed in a device type field. Alternatively, the device type information may be conveyed in the first identity code field, wherein each one of a plurality of different ranges or groups of possible identity codes correspond to different one of a plurality of different device types.

In addition, the method may also include enrolling the particular sensor-transmitter into the integration device during an enrollment process. The enrollment process may include storing the first identity code for the particular sensor-transmitter in memory of the integration device, so that information associated with the stored first identity code is retrievable for building the second message packet. Also, the enrollment process may also include storing information that identifies the device type identified for the particular sensor-transmitter in the memory of the integration device in association with the stored first identity code for the particular sensor-transmitter. In this case, the stored device type information being stored in the integration device may be for use in building the second message packet. Also in this case, the stored device type information for the particular sensor-transmitter may be stored in a format that corresponds to the device type encoding mechanism of the second message packet protocol. The enrollment process may also include generating the second identity code in the second identity code field format, and storing the second identity code in the memory of the integration device in association with the stored first identity code and the stored device type information, the second identity code being stored in the integration device for use in building the second message packet.

The first identity code field of the first packet protocol may be a 24-bit field for a 24-bit code that uniquely identifies a sensor-transmitter in the wireless security system from among other sensor-transmitters. The second identity code field of the second packet protocol may be a 20-bit field for a 20-bit code that uniquely identifies a sensor-transmitter in the wireless security system from among other sensor-transmitters. The device type encoding mechanism of the second packet protocol may be a field within the message packet, or alternatively, may be embedded in a selected second identity code in the second identity code field, wherein each one of a plurality of different ranges or groups of possible identity codes correspond to different one of a plurality of different device types. In the latter case, the second packet protocol may be the same as the first packet protocol, except that the second packet protocol includes the device type encoding mechanism that is not included in the first packet protocol.

The second condition information field of the second packet protocol may be designed to convey information about a recent change in state of one or more conditions sensed by the sensor-transmitter, as well as a current state of the one or more conditions sensed by the sensor-transmitter. The information about the recent change in state may be conveyed in one or more latch bits that are each set for a period of time following a change of state into a sensed condition that may represent an alarm state, as in the case wherein the system control device is armed.

In another aspect, there is provided methods and corresponding systems, devices and components for configuring and communicating within a wireless security system that comprises a system control device that communicates using message packets that differ in packet protocol than is used by a sensor-transmitter. In this aspect, the method comprises receiving, at an integration device, information that identifies a device type for a particular sensor-transmitter. The particular sensor-transmitter is configured to transmit information in message packets wherein each message packet is formatted according to a first packet protocol that comprises a first identity code field in a first identity code field format, wherein a first identity code in the first identity code field identifies the particular sensor-transmitter from among other sensor-transmitters. The method also includes enrolling the particular sensor-transmitter into the integration device. The enrolling of the particular sensor-transmitter includes storing in memory information indicative of the received device type for the particular sensor-transmitter. The method also includes subsequently receiving, at the integration device, a wireless transmission comprising a first message packet that includes the first identity code in the first identity code field, the first identity code indicating to the integration device that the transmission was sent by the particular sensor-transmitter previously enrolled in the integration device. The method also includes formulating and sending, by the integration device, a wireless transmission comprising a second message packet formatted according to a second packet protocol that comprises a second identity code field in a second identity code field format. The second message packet includes information indicative of the received device type for the particular sensor-transmitter obtained from the information stored in memory during enrollment.

In various implementations, the receiving, at the integration device, of the information that identifies the device type for the particular sensor-transmitter may include receiving a user selection of one of a plurality of different selectable device types during an enrollment process. Other features and variations of this aspect as discussed previously and later are also possible.

In yet another aspect, there is provided an integration device for use in a wireless security system. The integration device includes a wireless transceiver configured to: a) receive wireless transmissions of message packets formatted according to a first packet protocol that comprises i) a first identity code field in a first identity code field format, and ii) a first condition information field in a first condition information field format; and b) formulate and transmit transmissions of message packets formatted according to a second packet protocol that comprises i) a second identity code field in a second identity code field format, ii) a device type encoding mechanism, and iii) a second condition information field in a second condition information field format. The integration device also includes enrollment memory configured to store information pertaining to sensor-transmitters enrolled into the integration device, and a device type input component configured to receive information that identifies a selected one of a plurality of predefined device types for a particular sensor-transmitter being enrolled into the integration device. The integration device also includes a processing component programmed to: a) receive, from the transceiver, a first message packet that is formatted according to the first packet protocol from a transmission received from a particular enrolled sensor-transmitter, the first message packet comprising i) a first identity code in the first identity code field, the first identity code identifying the particular sensor-transmitter from among other sensor-transmitters, and ii) first sensed condition information in the first condition information field format, the sensed condition information indicative of condition information sensed by the particular sensor-transmitter; and b) build, in response to receiving the first message packet, a second message packet formatted according to the second packet protocol, the second message packet comprising i) a second identity code in the second identity code field, the second identity code identifying the particular sensor-transmitter from among other sensor-transmitters, ii) information in the device type encoding mechanism that identifies the device type identified for the particular sensor-transmitter, and iii) translated sensed condition information in the second condition information field format, the translated sensed condition information being derived from the first sensed condition information.

The details of one or more embodiments are set forth in the accompanying drawings and the description below. Other features, objects, and advantages will be apparent from the description and drawings, and from the claims.

DESCRIPTION OF DRAWINGS

FIGS. 2A and 2B are charts that show two different example communication protocols that may be used for wireless communications in a wireless security systems.

Like reference symbols in the various drawings indicate like elements.

DETAILED DESCRIPTION

This document generally describes components and methods that make possible the modification or expansion of an existing wireless security system, so that existing components can be used with new components, and in addition, make possible the use of sensor-transmitters within the same security system that use different communications protocols. In wireless security systems, wireless transmitting devices (transmitters, or sensor-transmitters), including sensing devices, communicate with a system control device using radio frequency (RF) wireless transmissions. Generally, the components and methods described in this document enable transmitters that use one communication protocol to be used by a system control device that is designed to communicate using a different communication protocol.

Figure 1:
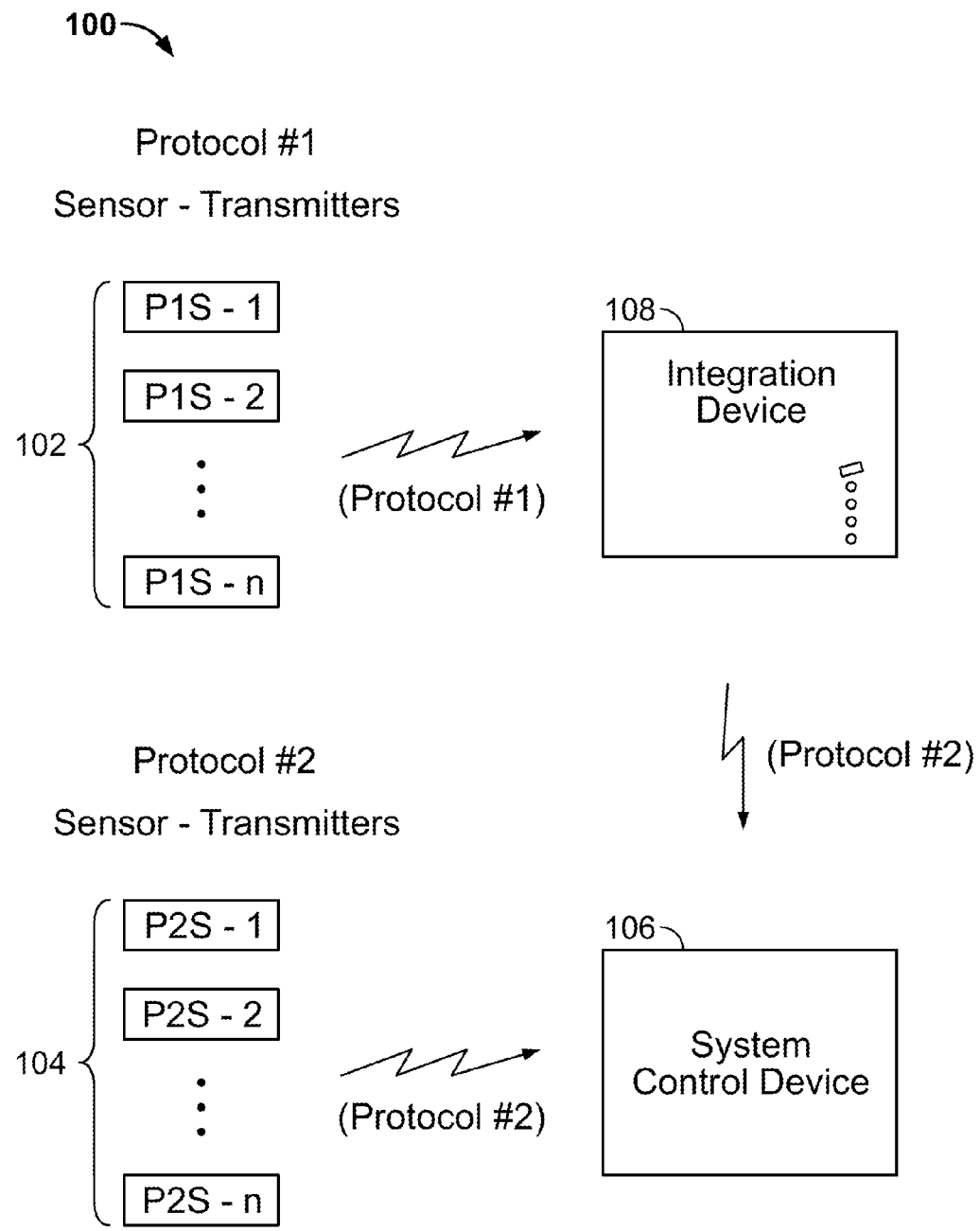
FIG. 1 is a system diagram including components of an existing wireless security system and expansion components.

An example integrated wireless security system 100, shown in FIG. 1, includes a group of Protocol #1 sensor-transmitters 102 (sensors P1S-1 through P1S-n), and a group of Protocol #2 sensor-transmitters 104 (sensors P2S-1 through P2S-n). Protocol #1 sensor-transmitters 102, may be sensors from an existing security system, and thus may be referred to in this specification from time to time as existing sensor-transmitters, whereas Protocol #2 sensor-transmitters 104 may be newly installed sensor-transmitters that are compatible with a new system control device, and thus may be referred to in this specification as new sensor-transmitters. It will be appreciated, however, that the Protocol #1 and Protocol #2 sensor-transmitters need not be existing or new, but rather may be part of a new system implementation that uses sensor-transmitters that utilize different protocols, be they from the same manufacturer or different manufacturers.

The system also includes a system control device 106, which may also be referred to as a control panel, and an integration device 108. The system control device 106 controls the operation of the security system, for example, by processing information provided by the sensor-transmitters 102 and 104 via RF wireless transmissions, and determining an appropriate system operation, such as issuing an alarm message. The integration device 108 serves integration and translation functions so that the Protocol #1 wireless sensor-transmitters 102, for example, are able to be used in the system 100.

Although in this FIG. 1 the sensor-transmitters may be referred to as "existing" and "expansion," it will be appreciated that the techniques in this document need not only be applied to a scenario wherein an existing wireless security system is being expanded or modified. Rather, the techniques described in this document also apply to a scenario wherein a security system is being built anew, and it is desired that the system include wireless sensor-transmitters that use different communications protocols, for example, because they are made by different manufacturers and are designed to be used with a particular system control device. Also, the techniques may also apply to a scenario where the sensor-transmitters with the different protocols are from the same manufacturer.

A wide variety of wireless sensor-transmitters 102 and 104 may be used in a wireless security system such as that shown in FIG. 1, ranging from sensing devices to user control devices. Typical sensing devices include, to name a few, 1) door and window sensors that have an internal reed switch that is open or closed depending on the sensors proximity to a magnet provided on the door or window; 2) smoke detectors; 3) glass break sensors that evaluate the frequencies of sound to determine if a nearby window has been broken; 4) motion sensors, such as passive infrared (PIR) motion sensors; (5) temperature sensors that ensure, for example, the temperature of a facility has not fallen below or has not exceeded a pre-set temperature. Other sensors are also possible for use with the techniques and components described in this document, and so the above list is intended to be exemplary only.

In addition to sensing-type transmitters, other types of wireless transmitters may also be used in a wireless security system such as the system 100 shown in FIG. 1. For example, a key fob or similar hand-held control device may be used by a user to provide instructions via RF transmissions to the system control device 106, for example, to arm or disarm the system 100. These devices are also sensors in one sense of the term, because these devices sense key depressions made by a user, for example. In addition, remote control keypads, located for example in a person's bedroom or near an entry door, may also use wireless transmissions to communicate information to the system control device 106. Another type of sensor-transmitter is a panic transmitter for emergency response that may be carried by a person, for example, an elderly or disabled person, and activated when the person needs help (for example, the "help me I've fallen and can't get up" device).

The sensor-transmitters 102 and 104 may be battery-operated devices that do not need AC power in order to operate. In this manner, sensor-transmitters 102 and 104 are easily installed in an existing facility. In some implementations though, some or all of the sensor-transmitters may be hardwired and receive power from a facility's AC power source. In such a case, the sensor-transmitter may nevertheless have a battery as a back-up power source, if for example, the AC power source for the facility is interrupted.

In addition, in most cases, the sensor-transmitters are transmit-only devices, and are not capable of receiving wireless transmissions. That may not be the case for all sensor-transmitters, however, as there may be some sensor-transmitters that are capable of also receiving information; for example, remote control keypads may be two-way communication devices capable of not only transmitting information to the system control device 106, but also receiving information provided by the system control device 106 so that it may be displayed to a user.

The Protocol #1 sensor-transmitters 102 may have been installed in a facility at a time prior to the other components of the system 104, 106 and 108 having been installed. In that sense, the components 104, 106 and 108 may be part of an upgrade that makes use of already installed sensor-transmitters that are operating satisfactorily. The Protocol #1 sensor-transmitters 102 would have, for example, been used in a system that used a different system control device than the system control device 106 shown in FIG. 1. For example, a different system control device that was specifically designed to receive and interpret wireless transmissions made by the Protocol #1 sensor-transmitters 102 may have been part of this system. The monitored facility owner may have decided, for example, to update the existing wireless security system, and that using a different system control device would be desirable.

The decision to swap in, or use, a different system control device may have been driven, for example, to implement increased functionality that may be provided with a new system control device, to allow the installer to install a system control device with which the installer is more familiar, to implement external monitoring functionality (for example, a monitoring service that receives alarms from the system control device 106) that is only available with a different type of system control device, and/or to add different types of sensors with perhaps different sensing and/or control capabilities, but that use a different protocol than is used by the existing system sensor-transmitters. In addition, it may also be the case that the existing sensor-transmitters and/or their designed system control device have become obsolete and/or are not supported anymore by its original manufacturer or their distributors, or that existing sensor-transmitters from a particular manufacturer are not entirely compatible or fully functional with certain system control panels from that same manufacturer.

As indicated in FIG. 1 by arrows, during operation of the system 100, wireless transmissions from the protocol #2 sensor-transmitters 104 are received directly by the system control device 106, whereas wireless transmissions from the Protocol #1 sensor-transmitters 102 are not received directly. Instead, wireless transmissions from the Protocol #1 sensor-transmitters 102 are received, firstly, by the integration device 108. The integration device 108 receives these wireless transmissions in a first protocol that is used by the existing sensor-transmitters 102, interprets if necessary state and other information provided in these wireless transmissions, and formulates and sends another wireless transmission using a second communications protocol that is different from the protocol used by the existing sensor-transmitters 102, but is a communications protocol that the system control device 106 is designed to detect, receive and process.

The frequency used in transmitting packets with the two different data format protocols need not be the same, and in fact, are typically not the same. In addition, the modulation of the two transmissions may be different, for example, one may use transmissions that are zwave, zigbee, infrared, etc.

Prior to system operation, a configuration process is performed, typically by a security system installer, in which wireless sensor-transmitters that are going to be part of the system are enrolled into the system control device 106. This enables the system control device 106 to know which sensor-transmitters are part of its system (and not part of a neighboring property whose sensor-transmitters may also be within transmission range but need to be ignored). In addition, this configuration process configures the system control device 106 to know the manner by which it is to respond to the communications it receives from sensor-transmitters that are part of its system 100.

In some but not all cases, one aspect of this configuration process may be to inform the system control device of the type of sensor-transmitter (that is, device type) for each enrolled sensor-transmitter. This configuration process is described later in connection with FIGS. 4A-4B. In some cases the "device type" information is included in the data packet protocol, whereas in other cases the "device type" information may need to be supplied separately (for example, by an installer).

In alternative configurations than that shown in FIG. 1, the integration device may be part of the system control device. In addition, the communication from the integration device need not be by an RF wireless transmission, but rather may be by hardwired connection. In addition, it will be understood that the functionality of the integration device may be entirely integrated into the system control device, such that the system control device is capable of detecting, receiving and interpreting both transmissions from the Protocol #1 sensor-transmitters 102 and the Protocol #2 sensor-transmitters 104, and the formulation of information in transmissions from Protocol #1 sensor-transmitters into a format complying with a protocol primarily used by the system control device may be performed entirely by computer and software controlled processes residing in the system control device.

FIGS. 2A and 2B illustrate two different example packet, or data, protocols that may be used by a wireless security system. Protocol #1 shown in FIG. 2A is described in part in U.S. Pat. No. 5,801,626 to Addy, and Protocol #2 shown in FIG. 2B is described in part in U.S. Pat. No. 4,855,713 to Brunius. The charts of FIGS. 2A and 2B show the order and nature of the bits of data that are sent in a data packet. Protocol #1 is a 64-bit packet, whereas Protocol #2 is a 59-bit packet.

The data packet protocol in FIG. 2A may be referenced, for illustration purposes, as an existing system protocol, whereas the data packet protocol in FIG. 2B may be referenced as an expansion system protocol. As such, and referring to FIG. 1, the existing sensor-transmitters 102 may use the Protocol #1 of FIG. 2A, and the expansion sensor-transmitters 104 and the system control device 106 may use the Protocol #2 of the FIG. 2A. That said, it will be appreciated that Protocol #2 may be the protocol used by the existing system-sensors, and Protocol #1 is the expansion protocol used by the new system control device and new sensors that may be implemented in the system. In addition, the two protocols may simply both be used in a new system being installed.

Referring to FIG. 2A, Protocol #1 is a 64 bit protocol, and starts with 16 introductory bits that may be referred to as training bits so the receiver sees that a message is coming (bits B0 through B15). The introductory bits include one pre-start bit (B0), 14 synchronization bits (B1-B14), and one start bit (B15). The synchronization bits have a predefined pattern and may be used to allow a receiver (for example, a system control device) to synchronize its detection capabilities with the timing of the transmission so that the information provided later in the data packet can be accurately and reliably detected. These synchronization bits may also be used to give the receiver time to settle its AGC (automatic gain control) and antenna switching activities in preparation for the data bits to come. Bits B16-B39 provide a unique identifier code for the particular sensor-transmitter device, or in other words, a device ID code. These numbers may be randomly assigned at a factory (with $1 \times 2^{24}$ different numbers possible), with the idea being that it is extremely unlikely that two sensor-transmitters with the same identity code will be distributed by the manufacturer for installation in or near the same wireless security system installation, and hence, every sensor-transmitter in a given system will have a unique identifier code that distinguishes it from the identifier codes of the other sensor-transmitters in the system and any sensor-transmitters used in any neighboring systems.

In some cases, a manufacturer may not utilize all possibilities of identity codes (that is, all of the $1 \times 2^{24}$ different ID codes) for fielded systems. For example, some ID codes (or ranges of ID codes) may be reserved for future use, testing, or some other reason. There may also be restrictions in certain alarm panels (system control devices) on acceptable or valid ID codes, and as such, an integration device may need to be aware of this. For example, if an integration device blindly translates an ID code for a sensor-transmitter (for example, a Protocol #1 sensor-transmitter) into another format (for example, Protocol #2), the integration device may translate the ID code (for example, for a Protocol #1 sensor-transmitter) to a rejected ID code on that panel (for example, a panel that is designed to communicate using Protocol #2), and thus would be rejected by the control panel. Accordingly, in these cases the integration device may check for these cases and ensure that all transmitted IDs in Protocol #2 are valid ID codes that will be received by a Protocol #2 control panel.

It also deserves mention that while some protocols have device type indicator bits, Protocol #1 shown in FIG. 2A does not, on its face, utilize a device type indicator. Typical device types may be, for example, a door-window sensor, a smoke sensor, a key fob device, etc. Device type information may useful to the system control device, so that the system control device is able to interpret the sensor state information unique to that device type provided by a particular sensor-transmitter, and react appropriately. Although the identity code information would not appear to utilize a device type indicator, it may be in some cases that the assignment of identity codes is not entirely random, and that certain sets of identity codes (ranges of ID codes, for example) may be put only in a certain type of sensor-transmitter. In such a case, the 24-bit identity code may contain sensor type information that a system control device would interpret as such (for example, because the ID code is within a range specifically for the particular device type).

Protocol #1 includes eight sensor state information bits (B40-B47). This group of bits provides information about the sensor and sensed conditions made by the sensor. The first four of these bits (B40-B43) are state bits for particular pins that may be in the sensor device and connected to a sensing point. For example, one pin may be connected to a reed switch that is able to detect if a door or window is open or closed. In other words, if the door is open (and the reed switch is normally closed when the door is closed), the pin would be high (and the bit would be 1), whereas the pin would be low when the door is closed (and he bit would be 0). Another pin may be tied to a tamper switch, intended to detect a situation wherein someone is trying to destroy or open up a sensor housing to disable the sensing and transmitting components. Another pin may be tied, for example, to external contacts provided on the sensor-transmitter housing. For example, a single sensor-transmitter may have a built-in reed switch monitoring a door, and its external contact may be wired to another reed switch that monitors a nearby window, for example. Not all the pins for which state information is provided need be used. Indeed, it is often the case that one or more of the pins are configured so that they are not used, and are always a 1 (tied high) or always a 0 (tied low), for example.

The next sensor state information bit B44 is a low-battery indicator. As described previously, the sensor-transmitters may be battery operated, and this information may be provided so as to inform a facility operator, for example a homeowner, and/or a monitoring company that a battery of a particular one of the sensor-transmitters needs to be replaced. A one (1) being transmitted for this bit may indicate, for example, that the battery is low. The next bit B45 is a supervisory bit, which indicates, for example, that the transmission is one that is a periodic "checking in," or supervisory transmission, instead of a transmission that was prompted by a state change. Each of the sensor-transmitters may provide a supervisory transmission periodically, for example, every half hour or so, or other periodic intervals.

The next state information bit B47 is a power-up indicator, which indicates that the sensor-transmitter has just powered up, for example, a battery has just been put in the sensor-transmitter, and this is the first transmission being made by the sensor-transmitter. A power-up transmission may be used, for example, in the enrollment process in which sensors to be used with a security system are enrolled into a system control device, as will be explained in more detail later. The last bit B47 of the sensor state information is a bit that indicates that the sensor-transmitter has supervisory transmission capability, given that some-sensor transmitters may be configured so that they do not make frequent supervisory transmissions, which may be desirable to save battery power. In addition, sensors that are taken off-site are typically not supervised. This may include key fobs, for example.

The final 16 bits are error checking bits, which may be, for example, a cyclical redundancy check (CRC). These bits provide information to ensure that all of the preceding bits were received and detected accurately as a one or a zero, as the case may be. If there is a discrepancy, a received packet may be ignored, and the next received packet will be used instead.

In operation, a sensor-transmitter using protocol #1 may make a transmission immediately following the occurrence of a state change, for example, a door has opened, thus changing the state of a corresponding reed switch, and the state of a pin tied to that reed switch. The transmission may be done in two sets of five redundant transmissions of the entire data packet of 64 bits. For example, upon a door opening, a sensor-transmitter may send a first set of five identical packets of 64 bits each in rapid succession, followed by a pause, and then a second set of five of the same identical packets. Thus, in total, a transmission corresponding to a state change may trigger the sending of ten identical, redundant packets. This redundancy accounts for the fact that multiple different sensor-transmitters may be in the environment transmitting at the same time, and so there may be collisions of those transmissions that prevent data from being received and interpreted properly. In one manner in which this protocol may be utilized in practice, once a particular data packet configuration is determined, all 10 subsequent transmissions will be the same, and will not be interrupted despite that a change in state may have occurred during the course of the 10 packets being transmitted.

A supervisory transmission sequence may consist of only one set of five redundant packets sent in rapid succession, in that it may not be important that any one supervisory transmission be missed. Although half the number of packets as set when there is a change of state, the operation for supervisory transmissions is similar in that all five packets are sent with the same packet information, despite that state information may have changed during the course of transmitting all five of these identical packets.

Referring now to FIG. 2B, Protocol #2 is a 59-bit protocol, and starts with 16 introductory bits of data (bits B0 through B15). The introductory bits include 15 synchronization bits (B0-B14), and one start bit (B15). As with Protocol #1, the synchronization bits of Protocol #2 are provided in a predefined pattern and may allow the receiver (system control device, for example) to synchronize its detection capabilities with the timing of the transmission so that the information provided later in the data packet can be accurately and reliably detected, and/or give the receiver time to settle its AGC and antenna switching activities in preparation for the data bits to come.

The next set of bits B16-B35 provide a unique identifier code for the particular sensor-transmitter device. As with Protocol #1, these identifier code numbers may be randomly assigned at a factory (with $1 \times 2^{20}$ different numbers possible for this protocol), with the idea being again that it is extremely unlikely that two sensor-transmitters with the same identity code will be distributed by the manufacturer for installation in or near the same wireless security system installation. As such, every sensor-transmitter in a given system will have a unique identifier code that distinguishes it from the identifier codes of the other sensor-transmitters in the system and any sensor-transmitters used in any neighboring systems.

Bits B36-B39 in Protocol #2 are a four-bit device type indicator. Typical device types may be, for example, a door-window sensor, a smoke sensor, a key fob device, etc. Sixteen different device types are possible with protocol #2, owing to the fact that four bits define the device type. Device type information may need to be known by the system control device 106, so that the system control device 106 is able to interpret the sensor state information provided by a particular sensor-transmitter. For example, in one device type, an external contact switch may be associated with certain sensor state information bit (for example, bits B50-B51), whereas in a different device type, those bits may be unused. In another example, the interpretation of a key fob may be programmed to be completely different than a door-window sensor; for example, the key fob can arm/disarm the security system while the door-window sensor does not typically have this ability.

The next set of three bits (B40-B42) are packet count bits. These bits increment on each packet that is transmitted. This allows a receiver to determine if a packet was missed, or that the receiver is receiving a duplicate transmission of a set of eight packets and thus the transmission can be ignored.

Protocol #2 includes twelve sensor state information bits (B43-B54), four more than Protocol #1. This group of bits in Protocol #2 provides information about the sensor and sensed conditions of the sensor as is the case with the eight sensor state information bits from Protocol #1, but the nature of the state information is quite different between the two protocols. For example, Protocol #1 provides information about the recent past (a latch state) in addition to the currently existing state of the sensor.

The sensor state information bits of Protocol #2 begin with a low battery indicator bit (B43), similar to bit B44 from Protocol #1. The remaining 11 bits (B44-B54) of the sensor state information for Protocol #2 provides state and latch information for five separate channels F1 to F5. These five channels are similar to the pins in Protocol #1, and may be tied to one or two reed switches, an external switch, a tamper switch, etc. The F3 channel may be tied to a tamper switch in all device types. Not all of the channels need to be used with every sensor-transmitter.

A state bit for a channel indicates the current state for a particular channel. For example, if a reed switch for a door tied to channel F1 indicates that the door is currently closed, the state bit for F1 (B44) will have a value that indicates a closed state for the door. A latch bit for a channel reflects a latch having been set associated with the channel going into a state that may in some cases be an alarm condition, such as the opening of the door. Thus, if a door associated with channel F1 is opened, state bit B44 will have a value that indicates the state of the door is open, and the latch bit B45 will have a value that indicates the door has been recently opened (for example, a value of one). The opening of the door sets the latch regardless of whether the opening of the door is an alarm condition or not. That is because if the system control device has been armed, the opening of the door will be considered an alarm, but if the system is not armed, the opening of the door will not be considered to be an alarm. The door sensor-transmitter does not know, however, whether the system is armed or not; hence, the latch is set whenever the door is opened.

The opening of the door initiates the transmission of multiple 59-bit data packets in rapid succession, as with Protocol #1. In particular, a counter device of the sensor-transmitter may be set to eight, and is decremented by one as each packet is sent, and so assuming the opened door is not immediately closed again, the opening of the door will cause eight 59-bit packets to be sent in rapid succession. The latch is reset (from 1 to 0, for example) when the packet counter decrements zero.

If, before the packet counter device decrements all the way to zero, the opened door is then closed, the counter in the sensor-transmitter will be reset to eight again, so that a full complement of eight packets are sent for the newly closed condition of the door. The latch bit will remain set (for example, with a value of one) reflective of the fact that the door was recently opened, because as mentioned, the latch bit does not reset (to a zero value, for example) until the transmission counter device decrements all the way to zero. If the open door, instead of being closed again before eight packets are sent, instead is closed only after all of the eight packets are sent, and the latch bit is reset to zero, then the change of state of the door (that is, the closing of the door) still initiates a new set of eight 59-bit packets. In this case, however, the latch bit is not set to one, because the closing of a door is not a condition that is indicative of an alarm condition.

As shown in FIG. 2B, each of the first four channels F1 to F4 has a state bit and a single latch bit. That is because each of these channels is associated with a normally closed contact. The fifth and final channel F5 has a state bit and two complementary latch bits, a positive latch bit (B52) and a negative latch bit (B52). That is because this channel F5 is associated with an external contact that may have a normally closed contact or a normally open contact. In that a normally closed contact will want its latch set upon the contact being opened (an alarm condition), the positive latch and associated latch bit B53 serves that purpose. In that a normally open contact will want its latch set upon the contact being closed (an alarm condition), the negative latch and negative latch bit B52 serves that purpose.

The next three bits (B55-57) of Protocol #2 are parity bits for error checking on the bits sent in the preceding bits of information. The final bit (B58) for Protocol #2 is a stop bit.

Figure 3:
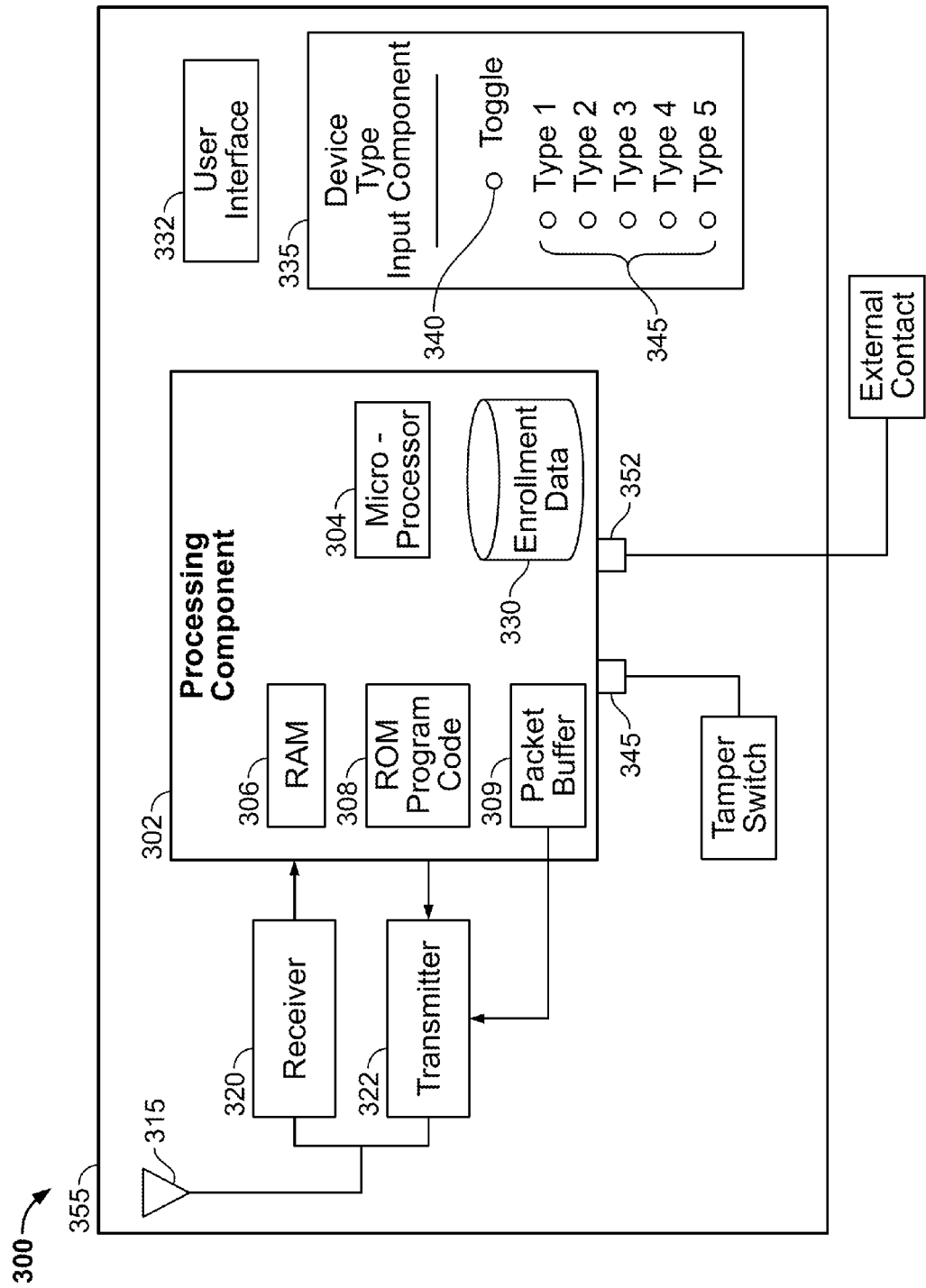
FIG. 3 is a block diagram of an example integration device that may be used in the system shown in FIG. 1.

Detail of an example implementation 300 of an integration device 108 used in the system 100 of FIG. 1 is shown in FIG. 3. In some but not all cases, it may be necessary to enroll existing or Protocol #1 sensor-transmitters (FIG. 1, reference number 102) into the integration device 108, in addition to enrolling them into the system control device 106.

In some cases, existing or Protocol #1 sensor-transmitters 102 need not be enrolled in the integration device 108. An example of this is when the integration device 108 acts simply as a translator and repeater of existing sensor data packets and no additional information is needed by the integration device in order to translate a packet received in one protocol into a different protocol for the transmission to the system control device. When the two different protocols both have, or both do not have, device type information (specific bits, or encoded ID), enrollment may not be needed. When the two different protocols are different, in that one's ID would be rejected by the system control device, and the other's ID would be accepted by the system control device, enrollment may not be needed, so long as the integration device 108 systematically and in repeatable fashion translates to a transmitted ID that does not conflict with other IDs in the security system.

In the FIG. 3 implementation, the integration device 300 includes a processing component 302 which in this implementation includes a microprocessor 304, random access memory (RAM) 306, read-only memory (ROM) 308 for storing executable program instructions (the program code), a packet buffer 309, and non-volatile memory 330 for enrollment data. Program instructions in ROM 308 are loaded into RAM 306 and are executed by the microprocessor 304 to carry out the functions of the integration device 108. The packet buffer 309 is where a packet to be transmitted is built and stored temporarily prior to transmission. The non-volatile memory 330 is for storing enrollment information regarding the existing sensor-transmitters 102 that are enrolled into the system, as will be described later in connection with FIG. 4A.

The integration device 300 of FIG. 3 also includes an antenna 315 connected to an RF wireless receiver 320 and an RF wireless transmitter 322. The antenna 315 and wireless receiver 320 enable the receipt of wireless transmissions from sensor-transmitters, for example the existing sensor-transmitters 102 of FIG. 1. The antenna 315 and wireless transmitter 322 enable wireless transmissions from the integration device 108 for receipt by the system control device 106 shown in FIG. 1. The data provided in a transmission by the transmitter 322 is provided by packet buffer 309. In other implementations, the packet buffer may be part of the transmitter 322.

The integration device 300 also includes a user interface component 332 operably connected to the processing component 302. The user interface component 332 may include input and output user interface devices such as buttons and/or a keyboard for a user to provide input, and visual displays and audio signals for output.

A device type input device 335 operably connected to the processing component 302 may also be provided in the integration device 300. This enables user-selected device type information to be provided to the processing component 302 for a particular sensor-transmitter that is being enrolled into the integration device 300, but which may not have such device type information contained in its communication protocol. A toggle switch 340 is provided on the device type input device 335 to enable a user to toggle between, for example, five different device types. The device types may be, for example, a door-window sensor, a smoke detector, a panic sensor, a key fob, a passive infrared (PIR) motion sensor, etc. The number of device types that may be selectable by a user need not be limited to five, but may be any number of different device types that would potentially be needed to be communicated by the integration device 300 to the system control device 106.

In one implementation shown in FIG. 3, five light-emitting diode (LED) indicators 345, one associated with each of the five different device types, are provided on the device type component 335. A user activates the toggle 340 in order to select one of the device types, the corresponding one of the LED indicators 345 indicating for a user the currently selected device type. A user may use the toggle to scroll down the list of device types in order to select one of them. A device type is selected by a user that corresponds to a particular sensor-transmitter being enrolled into the integration device 300, as will be explained in more detail later. Other mechanisms for device type selection by a user are also contemplated, such as a visual display device that displays a scrollable list, an audible indicator, an RF configuration tool, a hardwired data bus, or the user interface component 332 may be used for the device type selection.

The integration device 300 may also have a tamper switch 345 that is connected to an input 345 of the processing component 302, and an external contact 350 that is connected to another input 352 of the processing component 302. The external contact may be used to monitor something located near to the integration device 300, for example, a nearby window. The integration device 300 may be provided in a housing 355 as a stand-alone component. The device 300 may be powered by the AC power of the facility or by batteries (not shown). Instead of being a stand-alone device, an integration device 108 may be provided in a control panel housing that also houses the system control device 106. As discussed previously, the integration device may be co-located or integrated with a system control device. The integration device 108 may be powered by the system control device 106 too, given that system control devices often have 12V outputs that could be used and thereby provide power with backup battery.

Figure 4A:
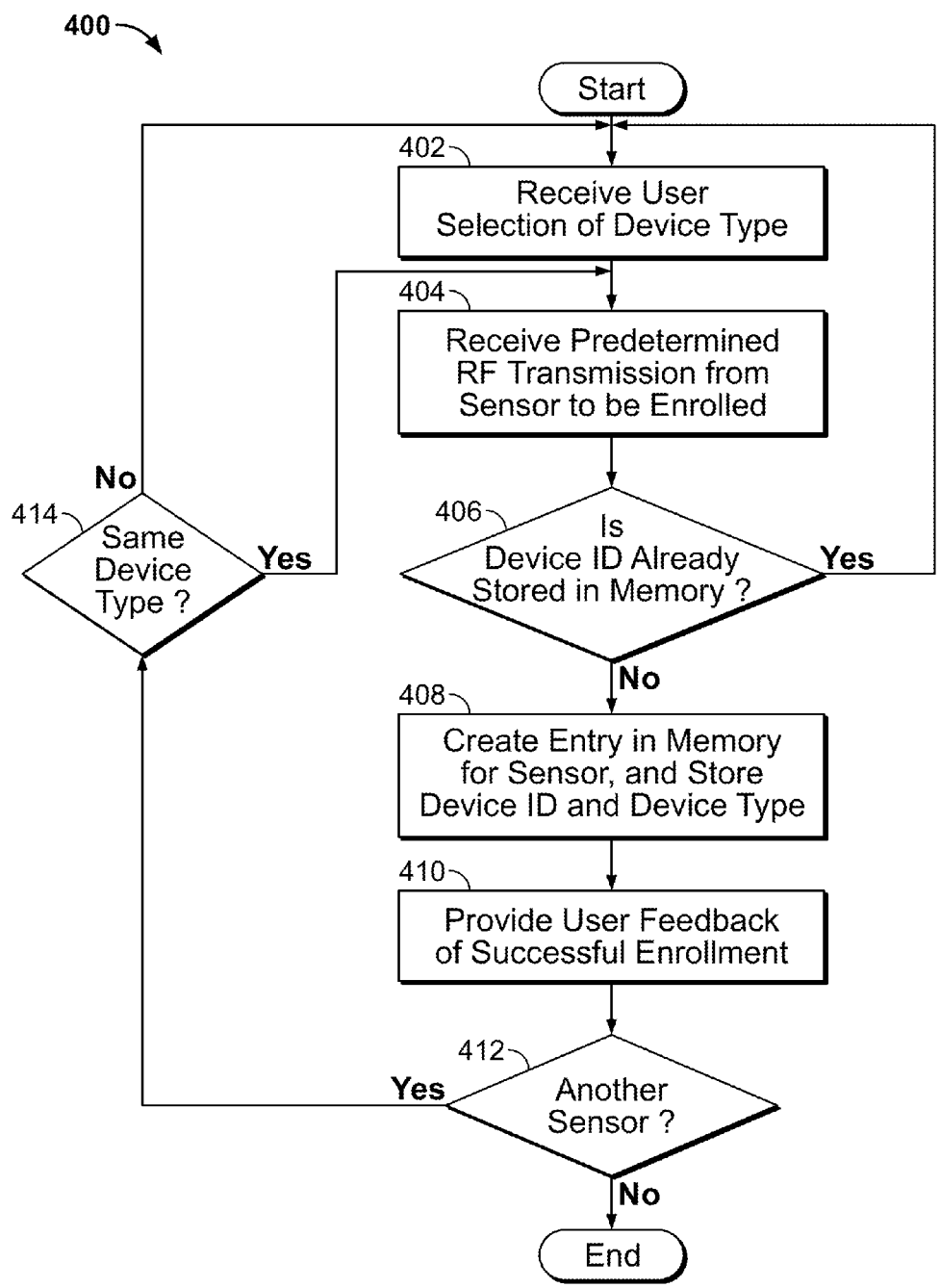
FIG. 4A is a flow chart of a process for enrolling a sensor device into an integration device of a wireless security system.

Turning now to FIG. 4A, a flowchart shows a process 400 that may be carried out by an integration device, such as the integration devices 108 and 300 shown in FIGS. 1 and 3, to enroll the Protocol #1 sensor-transmitters 102 (FIG. 1) into the integration device. In a case where more than one Protocol #1 sensor-transmitter 102 is to be enrolled, the sensor-transmitters 102 may be enrolled into the integration device 106 one at a time. After the Protocol #1 sensor-transmitters 106 are enrolled into the integration device 108, they may then be enrolled into the system control device 106, as will be described later in connection with FIG. 4B.

The process 400 of enrollment begins at step 402, wherein a user selection of one of multiple predefined device types that applies to a particular sensor-transmitter being enrolled is received. This may be done, for example, by the user selecting one of several predefined device types using the device type input device 335 shown in FIG. 3. The user may use toggle switch 340 to scroll through and select the correct predefined device type that corresponds to the sensor-transmitter being enrolled (for example, Protocol #1 sensor-transmitter P1S-1). For example, if P1S-1 is a door-window type sensor, then the door-window sensor device type may be selected by a user and thus received by the integration device. In addition, prior to the operation at step 402, the user may use the user interface component 332 associated with the integration device 300 in order to put the integration device 300 into an enrollment mode wherein enrollment is permitted.

Next, at step 404, the integration device receives a transmission from the sensor-transmitter being enrolled (for example, P1S-1 for which the device type was selected). The enrollment process 400 may use a predetermined transmission for this enrollment transmission, which predetermined transmission may be a transmission that may be rare and can be triggered actively by the user. This may ensure that the integration device enrolls the correct sensor-transmitter from among other transmitters that may be sending transmissions in the environment.

One way that a specific predetermined transmission may be done in Protocol #1, for example, is for the user to take the battery out of the sensor-transmitter and put it back in. This will trigger a power-up transmission by the sensor-transmitter in which the power-up bit (B46) is set high. The power-up bit (B46) being set high may then be considered a predetermined transmission that indicates to the integration device that the received transmission is the one that is to be enrolled. Another type of predetermined transmission may be a tamper transmission, triggered by a user opening up the housing for a transmitter, thus opening the tamper switch and creating a transmission wherein the bit associated with the pin connected to the tamper switch is high (for example, bit B41 of Protocol #1 in FIG. 2A associated with pin 2). Other predetermined conditions other than a power-up condition or a tamper condition may be used to distinguish the transmissions that are intended to be used in an enrollment process from among other transmissions that may be occurring in the environment (for example, a double trip method may be used, wherein some input at the sensor-transmitter must be toggled twice in a row and within a short time period). In addition, a predetermined transmission may not be used in some implementations; rather, any transmission may be utilized in the enrollment process.

Then, at step 406, the integration device checks its memory to determine if the device identification code (bits B16-B39 of Protocol #1) provided in the received enrollment transmission has been previously enrolled into the integration device. Information about previously enrolled sensor-transmitters may be stored in the non-volatile memory 330 (FIG. 3), and may include the identifier code for the enrolled sensor-transmitter. If the identifier code in the packet of the received predetermined transmission is already in the non-volatile memory 330, then the process of enrollment ends. This may be the case if either the particular sensor-transmitter has already been enrolled into the integration device, or the rare situation wherein a duplicate device identification code has been encountered and the sensor-transmitter that is being enrolled is present in another sensor-transmitter already enrolled. Either way, the process of enrollment ends, and the process proceeds back to step 402 where the next sensor-transmitter may be enrolled. In alternative implementations, it would be permissible to enroll over the top an already enrolled sensor, in which case step 406 may be omitted entirely and from step 402 the processing would proceed directly to step 408.

If the memory check at step 406 indicates that the device identifier code is not already stored in the integration device non-volatile memory 330 (or if step 406 is not included), then the process 400 proceeds to step 408. At step 408, an entry is created in the memory of the integration device (for example, an entry in enrollment data memory 330 in the FIG. 3 example) for the sensor-transmitter being enrolled. The entry may include, firstly, the device identifier code (bits B16-B39 in one embodiment) for the sensor-transmitter being enrolled, or a portion of that code (or a mutated version of that code). For example, the transmitter ID stored in the entry may be 20 bits of the 24-bit identifier code of Protocol #1, which is all that is needed for Protocol #2. In addition, the entry for the sensor-transmitter may include the selected device type, as selected by the user and received at step 402, and other information that may be provided by the user through the use of the user interface 332 for example. When the creation of the entry is done, and thus a successful enrollment at the integration device has occurred, at step 410 the integration device may provide user feedback, for example via user interface 332. The user feedback may be, for example, an audible beep indicating that the sensor-transmitter has been successfully enrolled, or a visual display on a visual display device of the user interface component 332.

If that sensor-transmitter just enrolled into the integration device is not the last of the existing sensor-transmitters 102 to be enrolled, as indicated by the decision node 412, then the enrollment process does not end, but rather proceeds to enroll the next sensor-transmitter. As such, the process 400 proceeds to step 402 in the event that the next sensor-transmitter is of a device type that is different from that of the sensor-transmitter just enrolled. If the device type is the same, however, as indicated by decision node 414, the process 400 instead proceeds directly to step 404. After all of the existing sensor-transmitters 102 are enrolled in the integration device, as indicated by decision node 412, the process 400 of enrollment in the integration device is complete, and enrollment of sensor-transmitters into the system control device may be done.

In alternative implementations, sensor-transmitters may be enrolled into the integration device by a user entering an ID number for the sensor-transmitter that may be printed on the sensor-transmitter for example, or by scanning a bar code that may be on the sensor transmitter. In such a case, an entry into the enrollment memory for the sensor-transmitter may be made using this ID code, and in addition, the entry may include any device type and other information about the sensor-transmitter that is received by the integration device. As such, the sensor-transmitter need not make a transmission in order to get enrolled, in some implementations.

Figure 4B:
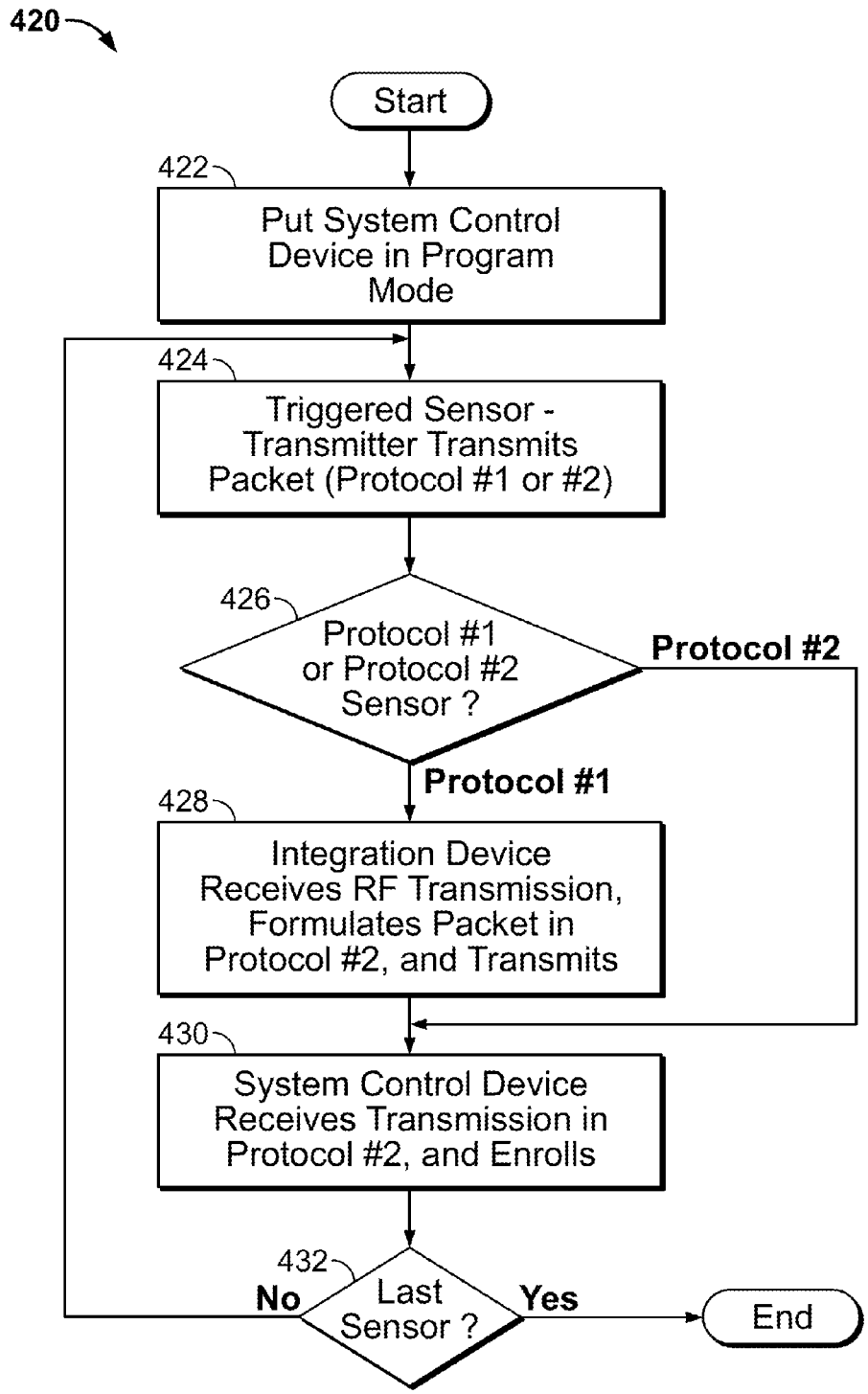
FIG. 4B is a flow chart of a process for enrolling a sensor device, previously enrolled in an integration device, into a system control device of the wireless security system.

Turning now to FIG. 4B, a flowchart shows a process 420 that may be carried out to enroll sensor-transmitters Protocol #1 and Protocol #2 sensor-transmitters into a system control device, for example, the system control device 106 in the FIG. 1 implementation. This process covers enrollment both of existing sensor-transmitters 102 that utilize for example Protocol #1 (FIG. 2A), and new or expansion sensors 104 that utilize for example Protocol #2 (FIG. 2B). As with the enrollment process at the integration device, the enrollment process at the system control device involves all of the sensor-transmitters that are to be a part of the wireless security system, and the enrollment process may be done one sensor-transmitter at a time.

The process 420 begins at step 422, wherein the system control device is put into a program mode which enables sensor-transmitters to be enrolled into the system control device. This may be done by a user putting the system control device into a program mode using a user interface component associated with the system control device.

Next, the process 420 proceeds to step 424, wherein a sensor-transmitter to be enrolled is triggered to transmit a transmission (for example, a predetermined transmission) that causes the sensor-transmitter to be enrolled. This may be done using a predetermined transmission type that is understood by the system control device to be a transmission for enrollment. This predetermined transmission may be a tamper transmission, wherein a tamper bit (for example, the state and latch bits for F3) in the transmission is set high. Other predetermined transmissions are also possible, for example, a power-up transmission in the case of existing sensor-transmitters that are configured to provide such transmissions, or any other transmission of that nature (for example, a double trip condition discussed previously).

If the sensor-transmitter being enrolled is an Protocol #1 sensor-transmitter 102, as indicated at decision box 426 in the flow diagram, then at step 428 the transmission using Protocol #1 is detected and received by the integration device. The integration device, further at step 428, receives the transmission, recognizes it as coming from a sensor-transmitter that has been already enrolled in the integration device (referring to the enrollment data in the non-volatile memory 330, for example), uses the information in the received transmission, along with any further information, such as device type, that was programmed and stored at enrollment, to formulate a data packet that is in conformity with Protocol #2, and transmits the formulated data packet for receipt by the system control device. The processing performed by the integration device in step 428 is described in more detail later in FIG. 4C. Also as discussed previously, there are cases in which enrollment into the integration devices need not be done; in such a case, the integration device still may receive the Protocol #1 transmission, and formulate and send a Protocol #2 transmission for enrollment in the system control device, as part of step 428.

One point about the processing by the integration device at step 428 deserves mention at this point, however. The Protocol #1 sensor-transmitter may convey a tamper condition (assuming that is the predetermined condition for enrollment) by bit B41 being high, if it is the case for the sensor-transmitter that the tamper device is configured to be connected to pin 2 of the existing sensor-transmitter. The integration device thus determines that a tamper condition is present, and in formulating the transmission it is to send in protocol #2, the integration device sets the state and latch bits B48 and B49 for the tamper channel (F3) to be high.

In other implementations, it may be possible to enroll a sensor-transmitter into an integration device and a system control device all in one step. For example, this may be done by putting both components (the integration device and the system control device) in an enrollment mode, and then tripping a sensor-transmitter to cause the enrollment transmission, wherein the integration device would then enroll the sensor-transmitter, and also formulate a Protocol #1 transmission for the system control device to also enroll the sensor-transmitter.

When an integration device is enrolling a Protocol #1 sensor, using a predetermined tamper transmission method, it may be desirable to require that the integration device receive two separate groups of transmissions (for two separate tamper events) within a brief period of time (4 seconds for example)—for example, a trip/restore or a restore/trip. This may be done because Protocol #1 does not inform in one packet whether or not the tamper "just" opened. It only tells us that the tamper "is" open. A set of packets showing tamper open could have been elicited by some other input (like reed switch or external contact changing states). As such, the only way to be absolutely sure that the installer meant to enroll that sensor may be by requiring the double event.

Additional processes may be performed to allow enrollment of a sensor-transmitter into a Protocol #2 system control device, regardless of whether a Protocol #1 sensor transmitter is enrolled into the integration device with a tamper trip/restore or a restore/trip. If a trip/restore is used, the sensor-transmitter may be enrolled into the integration device, and then the integration device may then send a special set of packets the F3 bits set (assuming this is what the Protocol #2 system control device requires for enrollment). The integration device may then send another set of packets with the F3 clear (because this is the correct actual state of the sensor). All this may be done to allow an installer to conveniently enroll sensor-transmitters into the integration device and system control device in one step.

Next, at step 430, the wireless transmission in Protocol #2 made by the integration device is detected and received by the system control device, and the existing sensor-transmitter being enrolled is enrolled into the system control device. As part of this process, the system control device recognizes the transmission as being the predefined type (tamper, for example) that is intended for the enrollment process, and responds accordingly to enroll the sensor-transmitter that was triggered to transmit the predetermined transmission. The enrollment process includes storing, in enrollment data memory for the system control device, a 20-bit device identifier code (bits B16-B35 of protocol #2 in FIG. 2B), and a device type for the sensor-transmitter. This 20-bit device identifier code may be formulated by the integration device from the 24-bit device identifier included in the existing sensor-transmitter device identifier code (bits B16-B39 of protocol #1 in FIG. 2A). In alternative implementations, the integration device could have a series of factory programmed 20-bit IDs that it uses as sensor-transmitters are enrolled, or the integration device may generate random IDs itself, for example, when a sensor is enrolled.

The device type for a Protocol #1 sensor-transmitter, for example, is specified in the enrollment data memory 330 of the integration device, and so that information may be encoded in the transmission sent by the integration device and received by the system control device using Protocol #2 in device type bits B36-B39. The device type is used by the system control device so that the system control device knows how to interpret data provided in a transmission from a sensor-transmitter during system operation. That is because for different sensor types, the sensor state information means different things, as discussed previously.

If the sensor-transmitter being enrolled is a Protocol #2 sensor-transmitter 104 (FIG. 1), as indicated at decision box 426 in the flow diagram, then the integration device is not involved in the enrollment process. In this case, the system control device, at step 430, detects and receives the transmission using Protocol #2 of the sensor-transmitter directly, and determines that its tamper bits B48 and B49 are high, thus indicating a predetermined transmission triggered for the enrollment process. That indicates that the sensor-transmitter that made the transmission is to be enrolled, and the device identifier code bits B16-B35 as well as the device type information in bits B36-B39 are stored in the system control device's enrollment memory.

After step 430, if the sensor-transmitter is not the last one to be enrolled, as reflected by decision node 432, then the process 420 goes back to step 424 and the next sensor-transmitter is enrolled. Once all of the sensor transmitters (existing and expansion) are enrolled, as reflected by decision node 432, the process 420 of enrollment of sensor-transmitters is complete and the process 420 ends.

Figure 4C:
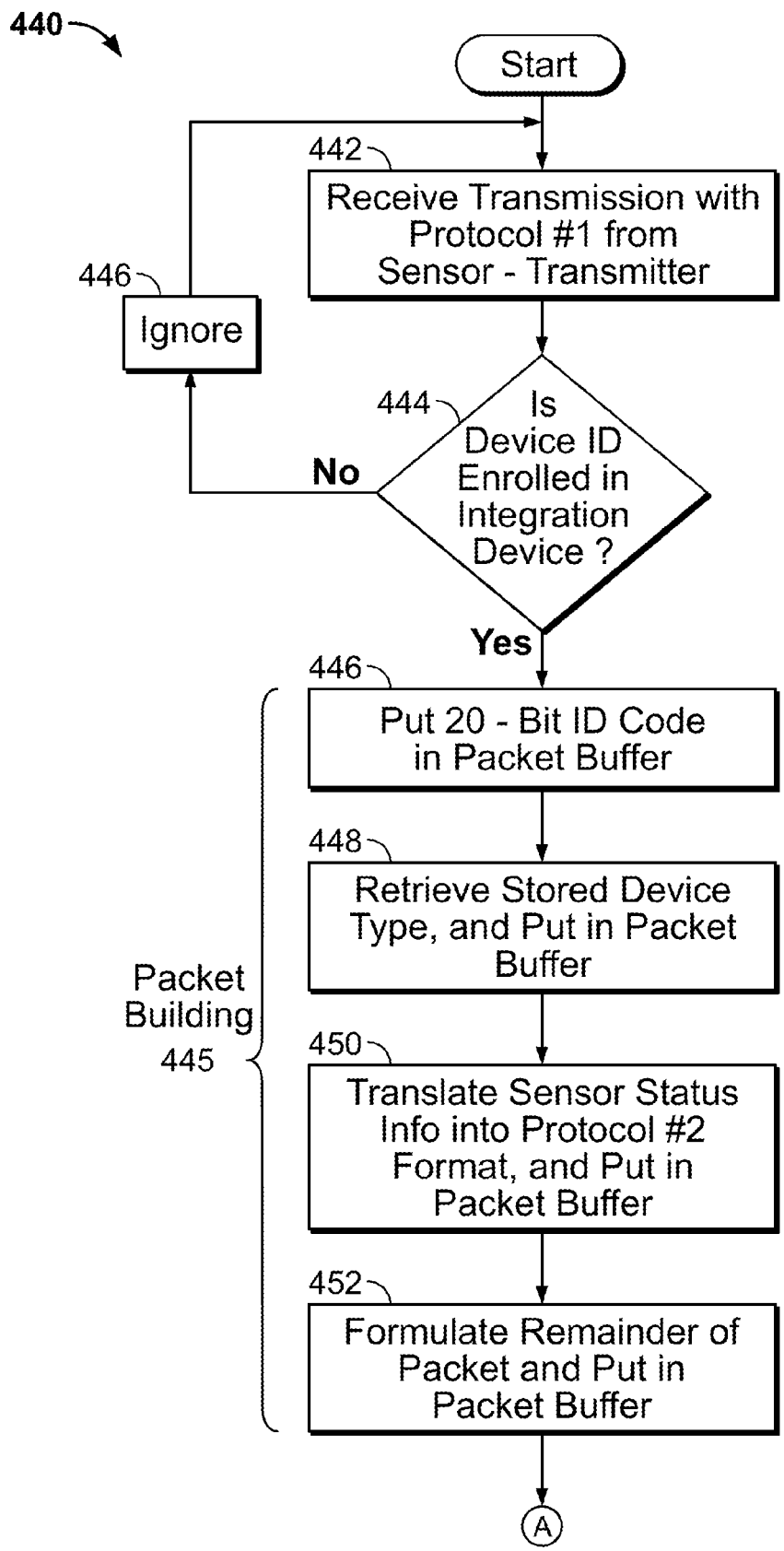
FIG. 4C is a flow chart of an operational mode for an integration device in a wireless security system.

In FIG. 4C, a flow chart shows a process 440 of normal mode of operation for an integration device after the enrollment process of FIGS. 4A and 4B is complete. In the normal mode of operation, as with the system control device enrollment process 420 shown in FIG. 4B, the integration device is only involved in transmissions made by the existing sensor-transmitters 102. Transmission by the new or expansion sensor-transmitters 104 are instead received directly by the system control device.

As will be appreciated, all of the sensor-transmitters 102 and 104 enrolled into the system will, at various times, make supervisory and change of state transmissions. These transmissions by the different sensor-transmitters are not coordinated with one another or with the system control device, and thus, the integration device and the system control device are constantly monitoring to detect and receive transmissions from the enrolled sensor-transmitters.

The process 440 shown in FIG. 4C begins with step 442, wherein an integration device detects and receives a wireless transmission from a particular Protocol #1 sensor-transmitter. Next, at step 444, the integration device obtains the device ID (bits B16-B39) from the transmission, and checks to determine if the wireless transmission has come from a sensor-transmitter that has been enrolled in the integration device. If not, then the transmission is ignored, as indicated at step 446, wherein the information stored in the integration device's receipt buffers may be discarded, for example. If so, then the integration device knows that the transmission came from an enrolled existing sensor-transmitter and initiates a process 445 to formulate a data packet in accordance with Protocol #2 that may be used by the system control device. That data packet may be temporarily stored as it is being built in packet buffer 309 (FIG. 3). As discussed previously, in some cases enrollment into the integration device may not be needed, in which case step 444 need not be performed, but instead processing may go from step 442 directly to step 446.

The process 445 of formulating, or building, a data packet in accordance with Protocol #2 may comprise four steps 446-452, the first of which includes determining a 20-bit device identifier code for bits B16-B35 of Protocol #2. This may be done by using the first 20 bits of the 24-bit device identifier code used in Protocol #1 (namely, bits B16-B36 of Protocol #1). Other materials may also be used, as discussed previously. However it is done, it important that the same process be used all the time, including for packet building done in the enrollment process (for example, in step 428 of FIG. 4B). Next, at step 448, the device type for the sensor-transmitter is retrieved from the enrollment data memory 330 and is converted to an appropriate four-bit device type code in Protocol #2 that is understood by the system control device. That four-bit code for the device type is put in the packet buffer at device type bits B36-B39. As will be appreciated, the applicable 4-bit devices type code may be determined during enrollment, stored in the entry for the particular sensor-transmitter, in which case those bits just need to be accessed and used during the packet building process 445.

The packet building process 445 then proceeds with step 450, wherein the integration device translates the sensor state information provided in the eight bits B40-B47 of Protocol #1 into the sensor state information needed for the eleven bits B43-B54 of Protocol #2. Because Protocol #1 does not use latches, but instead only uses state information, the translation process involves creating latch information where that is possible. To do this, in one implementation, the integration device may store the sensor state information for a received transmission in memory (for example, RAM 306). As such, when a new group of Protocol #1 packets is received, the integration device may compare the current state information with the most recent state information stored in the integration device memory to determine what, if anything, has changed. Then, for example, if the integration device determines from this comparison that a monitored door has just opened, the latch bit for the corresponding Protocol #2 channel (e.g., channel F1, for example) may be set high for the Protocol #2 packet being built to be transmitted, in addition to the state bit for F1 indicating the present state of the door is open. The translated state information is stored in the packet buffer at the appropriate bit locations. Then, at step 452, the remainder of the packet fields are created (for example, the error codes of B55-B57), and those are stored in the packet buffer.

Next, the process 440 proceeds to the transmission process wherein the built packets are transmitted by the integration device for receipt by the system control device. At step 454, a transmission counter in the integration device is set to eight, indicating eight separate transmissions are to be made of the same packet. Next, at step 456, the integration device makes a wireless transmission using the packet built and stored in the packet buffer 309, which transmission is thereafter detected, received, and acted upon by the system control device. Then, at step 458, the transmission counter in the integration device is decremented by one, so if this was the first transmission of a packet for example, the transmission counter would now be seven. If the counter has gone all the way to zero, as determined at step 460, the transmission process is complete and the process 440 ends. If the transmission counter has not yet reached zero, though, the process 440 proceeds to step 462 where it is checked whether the integration device has in the interim received a transmission from the same sensor-transmitter wherein a state change has occurred from the packet currently in the packet buffer 309 and being transmitted. This may be done, for example, by comparing the Protocol #1 state information to the Protocol #1 state information stored in the integration device for the last transmission received from the sensor-transmitter, as described previously.

As discussed previously, in one implementation, a sensor-transmitter transmitting in accordance with Protocol #1 sends two groups of five successive transmissions (10 transmissions in all), in the case of a state change. Each of these 10 transmissions includes the same data packet, and thus if a state change were to have occurred during the middle of a transmission sequence, the transmission sequence would not be altered, and instead the transmission process proceeds until all 10 transmissions are made.

In some cases, there may be delay between the integration device's receipt of accurately detected transmissions from a sensor-transmitter and its sending of translated transmissions to the system control device. For example in the integration devices, there may be an inter-packet transmit delay, or perhaps delays from other packets in the transmit buffer. Also, for example, a new set of 10 transmissions from the existing sensor-transmitter may commence and be detected by the integration device before the integration device has completed the transmission of all eight transmissions from a previous group of 10 transmissions. For example, it may be that with the first transmission of 10 packets, the first several packets of that group of 10 collided with other transmissions occurring in the environment, and thus were not accurately detected by the integration device. As such, the check at step 462 may optionally be made to address such a scenario.

If at step 462 the integration device determines that a new packet with different state information has been received by the integration device, then the integration device revises, at step 464, the sensor state information stored in the packet buffer accordingly. For example, if the state for a door window sensor indicates that an opened door is now closed, the F1 state bit B44 would be changed to low, although the latch bit B45 would remain high, thus indicating that the door was recently opened (that is, the packet counter has not decremented to zero). Then, after the packet buffer is properly revised, processing goes to step 454 wherein the transmission counter is reset again to eight. The process 440 then proceeds as described previously.

If at step 462, the integration device determines that a new packet with different state information has not been received by the integration device from the sensor-transmitter whose transmissions are in progress, then the process 400 proceeds back to step 456 wherein the next transmission is made (after some random delay) with the same packet stored in the buffer as was made with the previous transmission. Once the transmission counter decrements to zero, as determined at step 460, the transmission process ends. Before that happens, theoretically, there may be yet another group of transmissions from the same sensor-transmitter indicating yet another state change, in which case the process 400 goes to step 464 as described previously.

The transmit buffer in the translator can, in one implementation, hold up to 10 different packets (for example, for 10 different sensor-transmitters). The packets may be transmitted in sequence (1, 2, 3, 4, 5, 6, 7, 8, 9, 10, 1, 2 . . . ), rather than finishing all of the transmissions of one packet before starting to the next packet (1, 1, 1, 1, 1, 1, 1, 1, 1, 2, 2, 2, 2 . . . ). In other implementations, all transmission of one packet may be done before the next packet in the buffer is transmitted.

Should the integration device have a trouble that is not well represented by the specific data bits in the protocol for packets sent by the integration device and received by the system control device, the integration device may map unit trouble conditions into one of a plurality of existing reporting categories. A specific and important example of this may be loss of alternating current (AC) power. In many protocols there is no "AC Power lost" bit. So when AC power is lost, one approach to reporting it would be to stop sending supervisory transmissions from the integration device to the control panel.

Figure 4D:
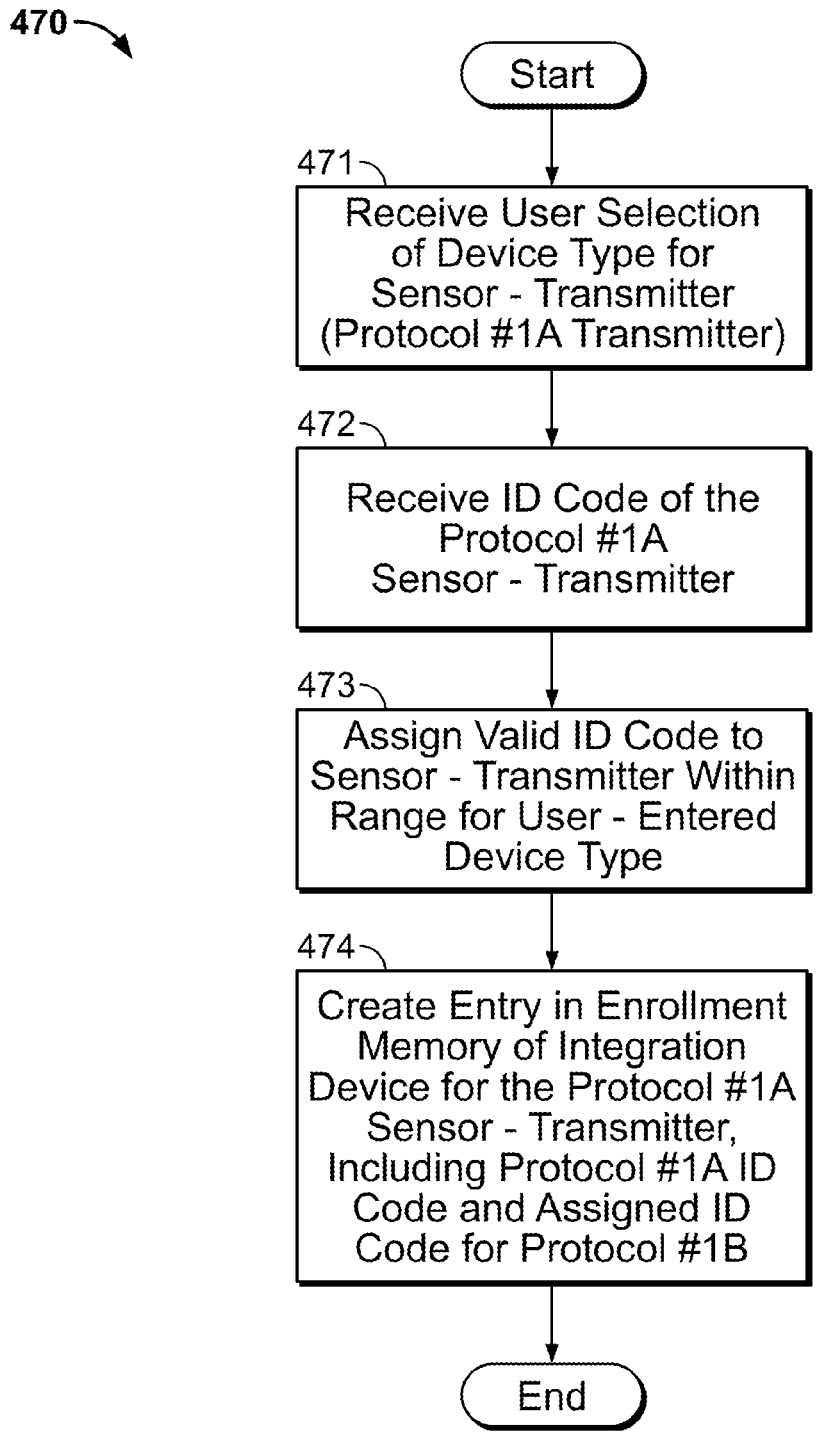
FIG. 4D is a flow chart of an alternative implementation of a process for enrolling a sensor device into an integration device of a wireless security system.

Turning now to FIG. 4D, an alternative implementation of the integration device enrollment process in which the same packets are sent for the two different protocols (Protocol #1A and Protocol #1B), but Protocol #1B has device type meaning embedded in the manner of how ID codes (bits B16-B39) are assigned by the manufacturer. In particular, under Protocol #1B, certain ranges of ID codes are reserved for particular device types, and so the ID code not only identifies the "unique" identifier for the particular sensor-transmitter within a security system, but also informs the system control device what device type that the sensor-transmitter is. As such, Protocol #1A does not include device type information, but Protocol #1B does, by virtue of the way that the ID codes are assigned to the sensor-transmitter in the factory.

In FIG. 4D, the process 470 begins with step 471, by the integration device receiving a user selection of a device type for a sensor-transmitter being enrolled into the integration device. This step 471 is similar to step 402 of the FIG. 4A process. Next, at step 472, the integration device receives the ID code information for the Protocol #1A sensor-transmitter, for example, through a transmission from the sensor-transmitter, or from entry of the ID code apart from a transmission, such as the entry of an ID code from a label on the sensor-transmitter, or by a bar code scan of the ID. Next, at step 473, the integration device may assign an ID code for the sensor-transmitter that is valid in the Protocol #1B format, because the assigned ID code falls within a range or group of ID codes that is reserved for sensor-transmitters of the selected type. Then, an entry is made in the integration device enrollment memory for the sensor-transmitter being enrolled. That entry may include, for example, the ID code in the Protocol #1A format, and the ID code in the Protocol #1B format, such that later a look-up operation can be performed after the receipt of the Protocol #1A transmission from the enrolled sensor-transmitter to determine the assigned ID code in the Protocol #1B format. Multiple sensor-transmitters may be enrolled into the integration device in this manner, as shown for example with FIG. 4A, although the flow chart of FIG. 4D only shows the enrollment for one sensor-transmitter. The Protocol #1A sensor-transmitters may also be enrolled in the Protocol #1B system control device, either in a separate process or as part of the process of enrolling the sensor-transmitter in the integration device.

Figure 4E:
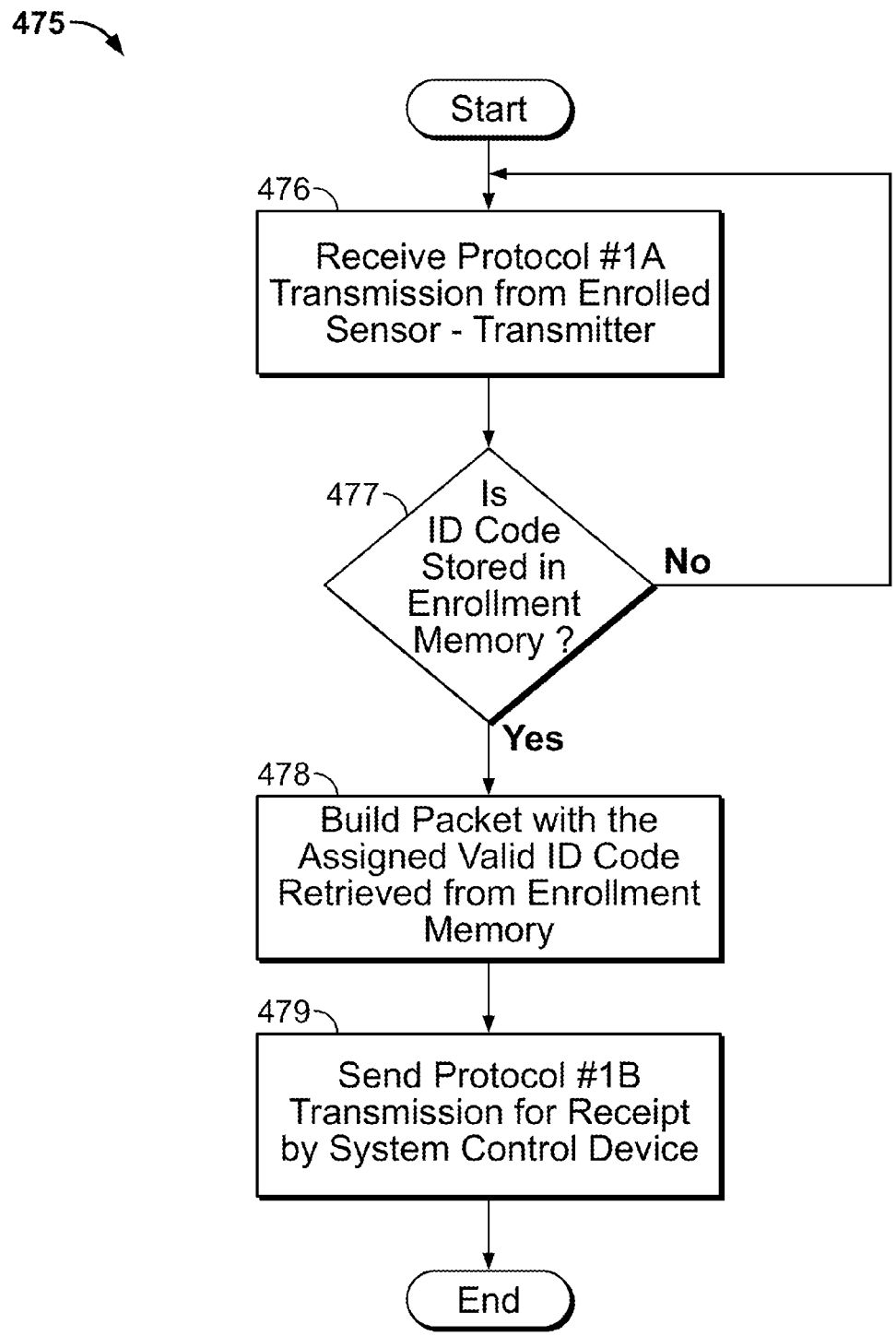
FIG. 4E is a flow chart of an operation mode for an integration device that uses the enrollment process shown in FIG. 4D.

FIG. 4E shows a process 475 performed by the integration device during operation of a wireless security system in which a sensor-transmitter is using the Protocol #1A format, and the system control device is using the Protocol #1B format, and the Protocol #1A sensor-transmitter has been enrolled in the integration device for example pursuant to the process of FIG. 4D. In step 476, the integration device receives a Protocol #1A transmission from the enrolled sensor-transmitter, and at step 477, the integration device determines if the ID code included in that transmission is in the enrollment memory of the integration device. If not, the transmission is ignored, and the process 475 returns to step 476. Otherwise, the integration device, at step 478, builds a packet for transmission in Protocol #1B, and in so doing, retrieves from memory the assigned ID code in the Protocol #1B format, for example, as stored in step 474 of the FIG. 4D process. The integration device, at step 479, transmits that packet wirelessly, so that it may be received and acted upon by the system control device that operates pursuant to Protocol #1B.

Figure 4F:
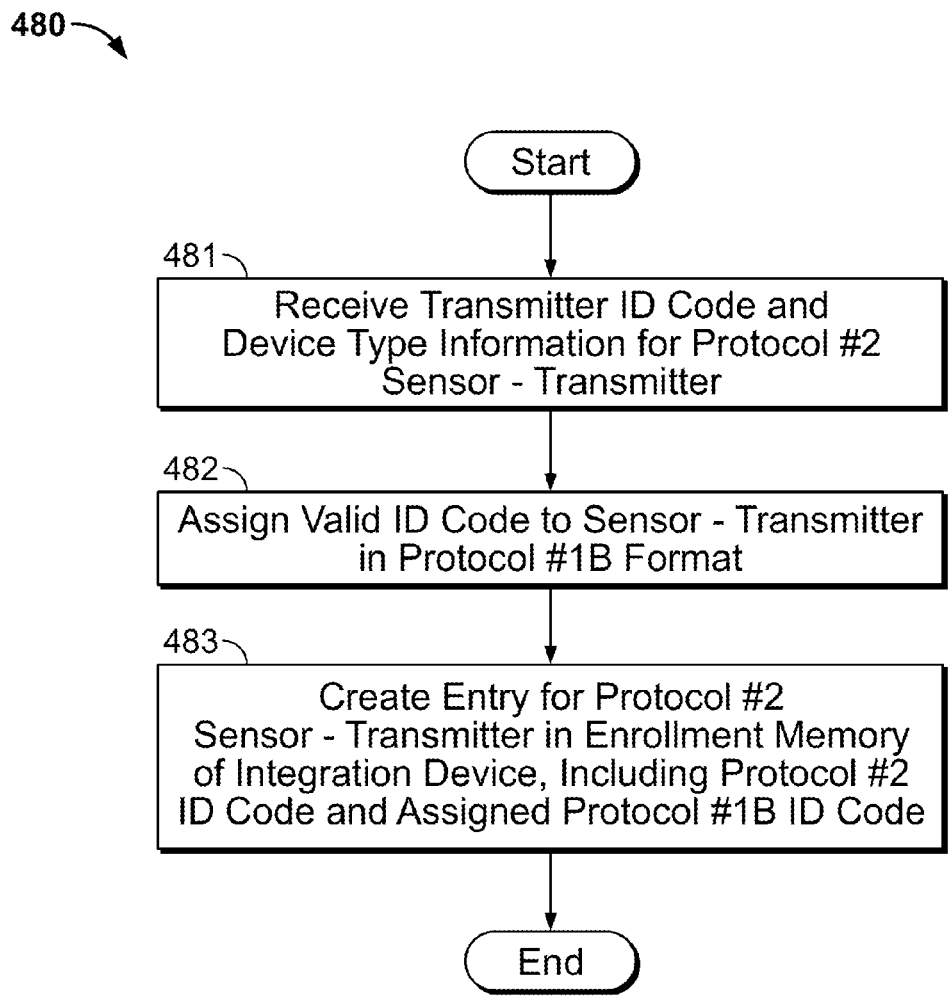
FIG. 4F is a flow chart of yet another alternative implementation of a process for enrolling a sensor device into an integration device of a wireless security system.

Turning now to FIG. 4F, another alternative implementation of an enrollment process 480 is shown for a scenario in which the system control device uses Protocol #1 (or more specifically, Protocol #1B, in which the sensor-transmitter ID code conveys device type information) and the sensor-transmitter uses Protocol #2. In this example, there is an enrollment of the Protocol #2 sensor-transmitter into the integration device, although in some implementations that may not be necessary, as will be described in connection with FIG. 4H.

The process 480 begins with step 481, in which the integration device receives the Protocol #2 sensor-transmitter 20-bit ID code (bits B16-B35, as shown in FIG. 2B) and device type information (bits B36-39). This may occur by the receipt of a transmission from the Protocol #2 sensor-transmitter, for example, a predetermined transmission for enrollment, or by entry of this information by some other means (entry separately, for example, by a bar code scan). Next, at step 482, the integration device assigns a valid ID code for the sensor-transmitter in the Protocol #1B format, namely, within a range or group of ID codes reserved for the particular type of device that the sensor-transmitter being enrolled is, as indicated in its device type bits (B36-B39). Then, at step 483, the integration device creates an entry in its enrollment memory for the sensor-transmitter being enrolled. The entry may include, for example, the ID code for the sensor-transmitter in the Protocol #2 format, and the assigned ID code in the Protocol #1B format, which as mentioned, also conveys device type information for the sensor-transmitter. A device type indicator separate from the Protocol #1B ID sensor-transmitter ID code need not be stored in memory in this case, although in some implementations it could be stored in memory. Again, multiple Protocol #2 sensor-transmitters may be enrolled into the integration device in this manner, and also enrolled into the Protocol #1B system control device.

Figure 4G:
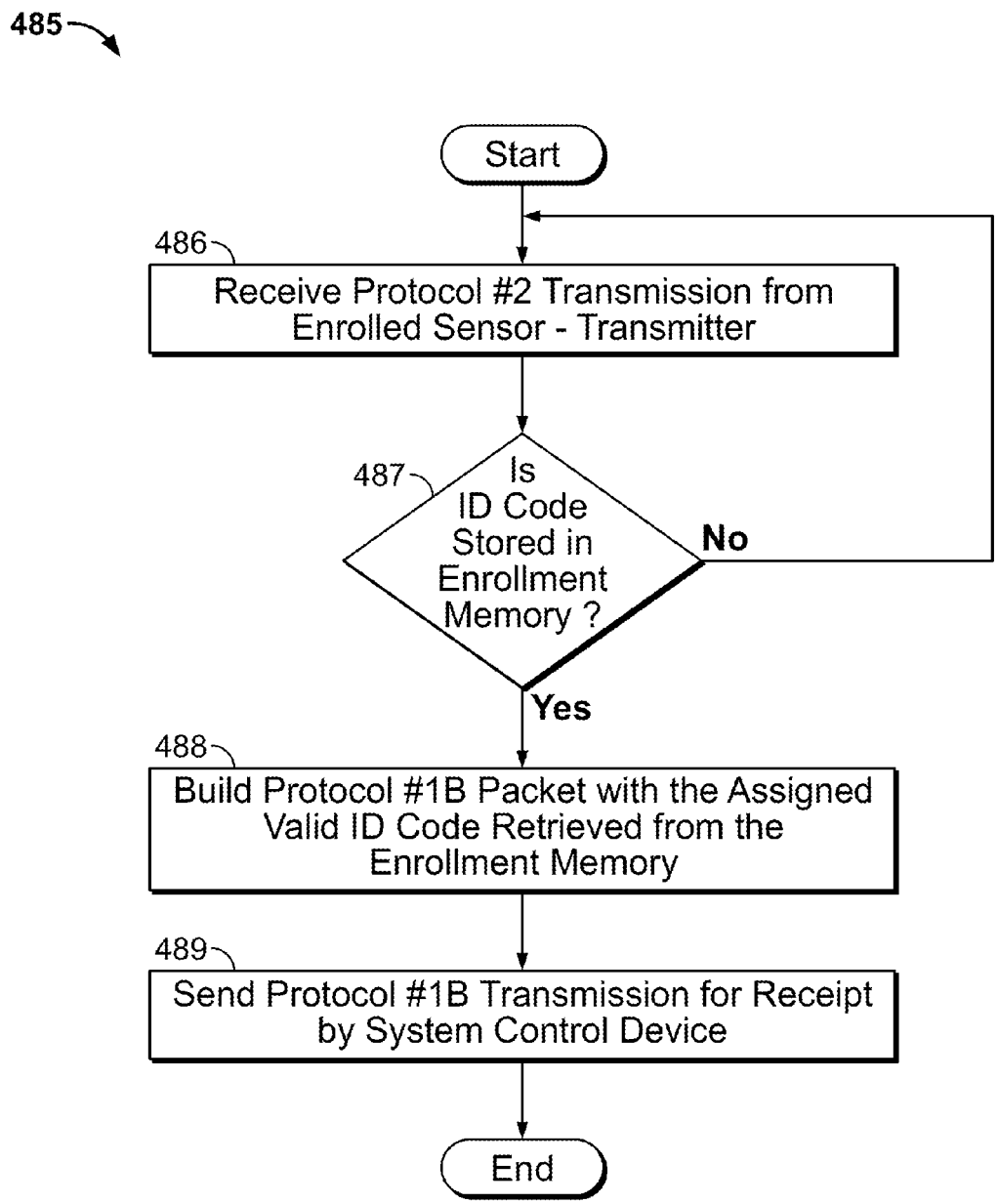
FIG. 4G. is a flow chart of an operation mode for an integration device that uses the enrollment process shown in FIG. 4F.

FIG. 4G shows a process 485 performed by the integration device during operation of a wireless security system in which a sensor-transmitter is using the Protocol #2 format, and the system control device is using the Protocol #1B format, and the Protocol #2 sensor-transmitter has been enrolled in the integration device for example pursuant to the process of FIG. 4F. In step 486, the integration device receives a Protocol #2 transmission from the enrolled sensor-transmitter, and at step 487, the integration device determines if the ID code included in that transmission is in the enrollment memory of the integration device. If not, the transmission is ignored, and the process 485 returns to step 486. Otherwise, the integration device, at step 488, builds a packet for transmission in Protocol #1B, and in so doing, retrieves from memory the assigned ID code in the Protocol #1B format, for example, as stored in step 483 of the FIG. 4F process. The integration device, at step 489, transmits that packet wirelessly, so that it may be received and acted upon by the system control device that operates pursuant to Protocol #1B.

Figure 4H:
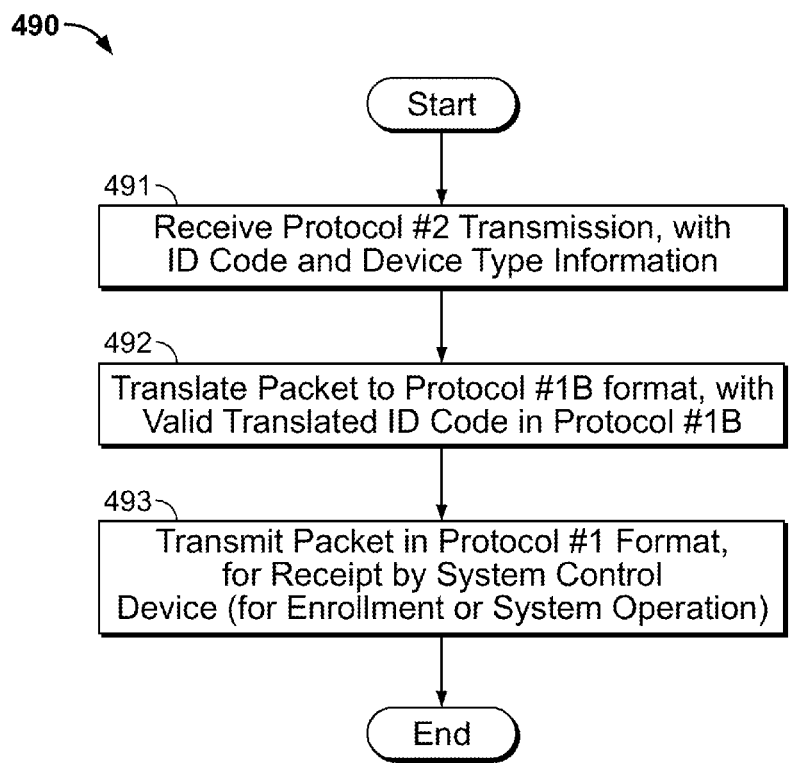
FIG. 4H is a flow chart of a process, which may be performed by an integration device, for communicating within a wireless security system.

Turning now to FIG. 4H, another alternative implementation of a process 490 for communicating within a wireless security system is shown for an operating scenario in which the system control device is designed to use Protocol #1B (in which the ID codes include device type information, as discussed in connection with FIGS. 4D-4E), and the integration device enables the Protocol #1B system control device to use sensor-transmitters that use Protocol #2. In this example, an enrollment process into the integration device is not performed, but is performed to enroll Protocol #2 sensor-transmitters into the Protocol #1B system control device. As such, the process 490 may be used in the process of enrolling a sensor-transmitter into the system control device, as well as being used in the process of communicating with the system control device during operation of the wireless security system.

The process 480 begins with step 491, in which the integration device receives the sensor-transmitter 20-bit ID code (bits B16-B35, as shown in FIG. 2B) and device type information (bits B36-39). In this example, this occurs by the receipt of a transmission from the Protocol #2 sensor-transmitter, for example, an enrollment transmission or a transmission during the course of operation of the security system. Upon receipt, the integration device translates the received Protocol #2 packet into a Protocol #1B packet, including the assignment of an ID code in the Protocol #1B format (namely, within a group or range of ID codes that are specific for the device type of the sensor-transmitter, as indicated by bits B36-B39). It is important in this case that the integration device use the same formula in all cases for translating the ID code and device type information from the Protocol #2 format into the Protocol #1B format, because the integration device will enroll that ID code and will expect that that ID code be sent in every transmission about the particular sensor-transmitter. Then, at step 493, the integration device transmits the Protocol #1B packet, for receipt by the system control device, for example, to enroll the sensor-transmitter into the system control device, or to communicate with the system control device during an operational mode of the wireless security system.

Figure 5:
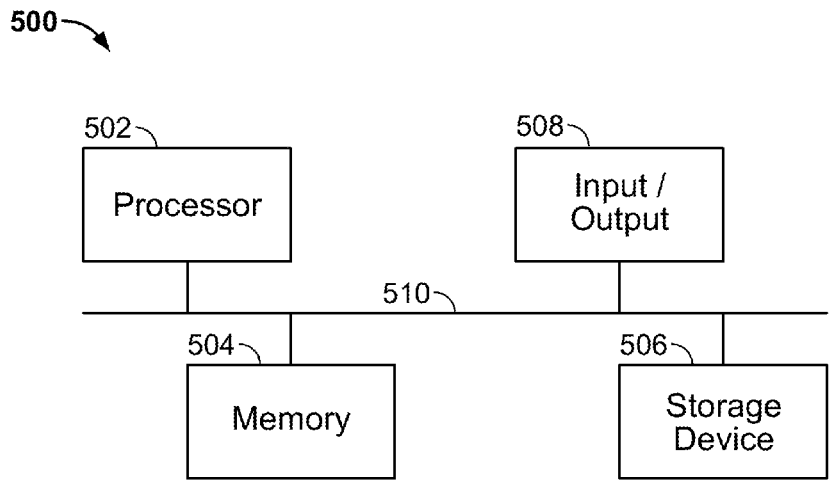
FIG. 5 is a block diagram of computing components that may be used in implementing the computer-implemented processes described in this document, for example, the functions performed by the integration device and the system control device.

FIG. 5 is a block diagram of a computing device 500 that may be used to implement the systems and methods described in this document. For example, the computing device 500 may be used in an integration device (such as the integration device 108 or 300 shown in FIGS. 1 and 3), in a system control device (such as the system control device 106 shown in FIG. 1), or in a combined integration and system control device as described previously.

Computing device 500 includes a processor 502, memory 504, a storage device 506, input and output devices 508 such a data entry devices and graphical displays, and a bus system 510 that provides for communications between these components. The processor 502 can process instructions for execution within the computing device 500, including instructions stored in the memory 504 or on the storage device 506 to perform various operations described previously in this document. In addition, the components described in this specification may also be implemented in firmware or on an application specific integrated circuit (ASIC), in which case this FIG. 5 diagram is simply illustrative of device operation.

Although a few implementations have been described in detail above, other modifications are possible. Moreover, other mechanisms for communicating within a wireless security system may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method of communicating within a wireless security system, the security system comprising (a) at least one sensor-transmitter configured to transmit information wirelessly in message packets that are each formatted according to a first packet protocol, (b) an integration device configured to receive wirelessly transmitted message packets formatted according to the first packet protocol and wirelessly transmit message packets according to a second packet protocol that is different from the first packet protocol; and (c) a security system control device configured to receive wirelessly transmitted message packets formatted according to the second packet protocol and having each of the at least one sensor-transmitter enrolled into the security system control device, the method comprising:

receiving, at the integration device and from a particular one of the at least one sensor-transmitter, a wireless transmission formatted according to the first packet protocol, the first packet protocol comprising a) a first sensor-transmitter identity code field in a first identity code field format, b) first condition information field in a first condition information field format, and c) a device type identifier field indicating a particular one of a plurality of different predefined device types of which a sensor-transmitter of the at least one sensor-transmitter that transmitted a wireless transmission is a member;

the received wireless transmission including a first message packet comprising a) a first assigned identity code in the first sensor-transmitter identity code field, the first assigned identity code distinguishing wirelessly transmitted packets relating to the particular one sensor-transmitter of the at least one sensor-transmitter from wirelessly transmitted packets formatted also according to the first protocol but relating to other sensor-transmitters of the at least one sensor-transmitter, b) first sensed condition information in the first condition information field, the first sensed condition information indicative of condition information sensed by the particular one sensor-transmitter of the at least one sensor-transmitter, and c) device type identifying information in the device type identifier field, the device type identifying information indicating a particular one of the plurality of different predefined device types of which the particular one of the at least one sensor-transmitter is a member;

building, by the integration device, a second message packet corresponding to the first message packet but formatted according to the second packet protocol that is different from the first packet protocol, the second packet protocol comprising a) second sensor-transmitter identity code field in a second identity code field format, and b) second condition information field in a second condition information field format, wherein the second packet protocol includes information indicative of the device type for the sensor-transmitter of the at least one sensor-transmitter making the wireless transmission;

the second message packet built by the integration device comprising a) a second assigned identity code in the second sensor-transmitter identity code field, the second assigned identity code distinguishing wirelessly transmitted packets relating to the particular one sensor-transmitter of the at least one sensor-transmitter from other wirelessly transmitted packets formatted also according to the second protocol but relating to other sensor-transmitters of the at least one sensor-transmitter, and b) translated sensed condition information in the second condition information field, the translated sensed condition information being derived at least in part from the first sensed condition information and representing a condition sensed by the particular one sensor-transmitter of the at least one sensor-transmitter, the contents of the second message packet being based at least in part upon the device type identifying information contained in the device type identifier field of the first message packet; and wirelessly transmitting, by the integration device, the second message packet relating to the particular one sensor-transmitter of the at least one sensor-transmitter for receipt by the security system control device, the security system control device having been preconfigured such that the particular one sensor-transmitter of the at least one sensor-transmitter is enrolled into the security system control device in a manner that the particular one sensor-transmitter of the at least one sensor-transmitter is associated with the second assigned identity code.

2. The method of claim 1, wherein the contents of the second message packet being based at least in part upon the device type identifying information comprises the second assigned identity code comprising an identity code within a range or group of identity codes reserved for the particular type of the particular one sensor-transmitter.

3. The method of claim 2, further comprising a predicate step of the integration device receiving a predetermined message for enrollment from the particular one sensor-transmitter, and in response assigning for the particular one sensor-transmitter the identity code within the range or group of identity codes reserved for the particular type of the particular one sensor-transmitter.

4. The method of claim 3, further comprising a further predicate step of the integration device creating an entry in its enrollment memory for the particular one sensor-transmitter being enrolled into the integration device.

5. The method of claim 4, wherein the entry comprises the first assigned identity code and the second assigned identity code.

6. The method of claim 4, wherein upon the integration device receiving the wireless transmission formatted according to the first packet protocol, the integration device determines if the first assigned identity code is in the enrollment memory, and if not the wireless transmission is ignored, and if otherwise the integration device builds the second message packet formatted according to the second packet protocol.

7. The method of claim 2, further comprising a predicate step of enrolling the particular one sensor transmitter into the system control device and not the integration device.

8. The method of claim 7, wherein the receiving, the building and the wirelessly transmitting processes are the same whether the received wireless transmission is a predetermined enrollment transmission to enroll the particular one sensor-transmitter into the security system control device or is a transmission during normal operation of the wireless security system after enrollment of the particular one sensor-transmitter.

9. A method of communicating within a wireless security system, the security system comprising a) at least one sensor-transmitter configured to transmit information wirelessly in message packets that are each formatted according to a first packet protocol, b) an integration device configured to receive wirelessly transmitted message packets formatted according to the first packet protocol and wirelessly transmit message packets according to a second packet protocol that is different from the first packet protocol; and c) a security system control device configured to receive wirelessly transmitted message packets formatted according to the second packet protocol and having each of the at least one sensor-transmitter enrolled into the security system control device, the method comprising:

receiving, at the integration device and from a particular one of the at least one sensor-transmitter, a wireless transmission formatted according to the first packet protocol, the first packet protocol comprising a) a first sensor-transmitter identity code field in a first identity code field format, and b) first condition information field in a first condition information field format, the particular of the at least one sensor-transmitter being a particular one of a plurality of different types of devices;

the received wireless transmission from the particular one sensor-transmitter of the at least one sensor-transmitter including a first message packet comprising a) a first assigned identity code in the first sensor-transmitter identity code field, the first assigned identity code distinguishing wirelessly transmitted packets relating to the particular one sensor-transmitter of the at least one sensor-transmitter from other wirelessly transmitted packets formatted also according to the first protocol but relating to other sensor-transmitters of the at least one sensor-transmitter, and b) first sensed condition information in the first condition information field, the first sensed condition information indicative of condition information sensed by the particular one sensor-transmitter of the at least one sensor-transmitter;

building, by the integration device, a second message packet corresponding to the first message packet but formatted according to the second packet protocol that is different from the first packet protocol, the second packet protocol comprising a) second sensor-transmitter identity code field in a second identity code field format, and b) second condition information field in a second condition information field format, wherein the system control device is configured to interpret information contained in the second condition information field unique to the particular one device type of the particular one of the at least one sensor-transmitter from which the wireless transmission was received, and react appropriately;

the second message packet that is built by the integration device comprising a) a second assigned identity code in the second sensor-transmitter identity code field, the second assigned identity code distinguishing wirelessly transmitted packets relating to the particular one sensor-transmitter of the at least one sensor-transmitter from other wirelessly transmitted packets formatted also according to the second protocol but relating to other sensor-transmitters of the at least one sensor-transmitter, and b) translated sensed condition information in the second condition information field, the translated sensed condition information being derived at least in part from the first sensed condition information and representing a condition sensed by the particular one sensor-transmitter of the at least one sensor-transmitter; and wirelessly transmitting, by the integration device, the second message packet relating to the particular one sensor-transmitter of the at least one sensor-transmitter for receipt by the security system control device, the security system control device having been preconfigured such that the particular one sensor-transmitter of the at least one sensor-transmitter is enrolled into the security system control device in a manner that the particular one sensor-transmitter of the at least one sensor-transmitter is associated with the second assigned identity code, the security system control device having been further preconfigured to interpret information in the second message packet in a manner appropriate given the type of device of the particular one sensor-transmitter of the at least one sensor transmitter.

10. The method of claim 9, wherein the first packet protocol further comprises a device type identifier field indicating one of a plurality of different predefined device types of which the sensor-transmitter that transmitted the wireless transmission is a member, and the first message packet further comprises device type identifying information in the device type identifier field, the device type identifying information indicating the one of the plurality of different predefined device types of which the particular one of the at least one sensor-transmitter is a member.

11. The method of claim 10, wherein the contents of the second message packet are based at least in part upon the device type identifying information contained in the device type identifier field of the first message packet.

12. The method of claim 11, wherein the contents of the second message packet being based at least in part upon the device type identifying information comprises the second assigned identity code comprising an identity code within a range or group of identity codes reserved for the particular type of the particular one sensor-transmitter.

13. The method of claim 12, further comprising a predicate step of the integration device receiving a predetermined message for enrollment from the particular one sensor-transmitter, and in response assigning for the particular one sensor-transmitter the identity code within the range or group of identity codes reserved for the particular type of the particular one sensor-transmitter.

14. The method of claim 13, further comprising a further predicate step of the integration device creating an entry in its enrollment memory for the particular one sensor-transmitter being enrolled into the integration device.

15. The method of claim 14, wherein the entry comprises the first assigned identity code and the second assigned identity code.

16. The method of claim 14, wherein upon the integration device receiving the wireless transmission formatted according to the first packet protocol, the integration device determines if the first assigned identity code is in the enrollment memory, and if not the wireless transmission is ignored, and if otherwise the integration device builds the second message packet formatted according to the second packet protocol.

17. The method of claim 12, further comprising a predicate step of enrolling the particular one sensor transmitter into the system control device and not the integration device.

18. The method of claim 17, wherein the receiving, the building and the wirelessly transmitting processes are the same whether the received wireless transmission is a predetermined enrollment transmission to enroll the particular one sensor-transmitter into the security system control device or is a transmission during normal operation of the wireless security system after enrollment of the particular one sensor-transmitter.

* * * * *